United States Patent
Roberts et al.

(10) Patent No.: US 10,206,004 B2
(45) Date of Patent: Feb. 12, 2019

(54) SYSTEMS AND METHODS OF PROVIDING A MEDIA-ON-DEMAND-BASED PROGRAMMING CHANNEL

(71) Applicant: Verizon and Redbox Digital Entertainment Services, LLC, Basking Ridge, NJ (US)

(72) Inventors: Brian F. Roberts, Dallas, TX (US); Christina S. Siegfried, Irving, TX (US); Ann Gordon Prather, Dallas, TX (US); Paul Bradley Bowers, Winfield, IL (US); Imran Arif Maskatia, Palo Alto, CA (US); Brandon N. Wright, Irving, TX (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 92 days.

(21) Appl. No.: 14/141,895

(22) Filed: Dec. 27, 2013

(65) Prior Publication Data
US 2015/0020105 A1   Jan. 15, 2015

Related U.S. Application Data

(60) Provisional application No. 61/846,603, filed on Jul. 15, 2013.

(51) Int. Cl.
*G06F 3/00* (2006.01)
*H04N 21/472* (2011.01)
(Continued)

(52) U.S. Cl.
CPC ......... *H04N 21/472* (2013.01); *G06F 3/0482* (2013.01); *G06F 3/0484* (2013.01); *G06F 3/04842* (2013.01); *G06F 17/30861* (2013.01); *G06Q 20/18* (2013.01); *G06Q 30/0255* (2013.01); *G11B 27/02* (2013.01); *G11B 27/28* (2013.01); *H04L 65/601* (2013.01); *H04N 5/76* (2013.01); *H04N 7/163* (2013.01); *H04N 9/7921* (2013.01); *H04N 21/2387* (2013.01); *H04N 21/252* (2013.01);
(Continued)

(58) Field of Classification Search
None
See application file for complete search history.

(56) References Cited

U.S. PATENT DOCUMENTS 6,487,722 B1 * 11/2002 Okura ............... G06F 3/0481
348/E5.105
7,240,359 B1 * 7/2007 Sie et al. ................. 725/88
(Continued)

*Primary Examiner* — Samira Monshi

(57) ABSTRACT

An exemplary method includes a computer-implemented media service system 1) establishing a set of one or more conditions for a media-on-demand-based programming channel, 2) selecting, from a repository of on-demand media content and based on the set of one or more conditions, a set of on-demand media programs for inclusion in the media-on-demand-based programming channel, and 3) mapping the selected set of on-demand media programs to the media-on-demand-based programming channel to represent a scheduled, linear playback of the set of on-demand media programs on the media-on-demand-based programming channel in accordance with a linear playback schedule.

21 Claims, 13 Drawing Sheets

(51) Int. Cl.
| | |
|---|---|
| *G11B 27/28* | (2006.01) |
| *H04N 9/79* | (2006.01) |
| *G11B 27/02* | (2006.01) |
| *H04N 21/47* | (2011.01) |
| *H04N 21/482* | (2011.01) |
| *H04N 21/466* | (2011.01) |
| *G06Q 20/18* | (2012.01) |
| *G06Q 30/02* | (2012.01) |
| *G06F 3/0484* | (2013.01) |
| *H04L 29/06* | (2006.01) |
| *G06F 3/0482* | (2013.01) |
| *H04N 21/262* | (2011.01) |
| *H04N 21/458* | (2011.01) |
| *H04N 7/16* | (2011.01) |
| *H04N 21/2387* | (2011.01) |
| *H04N 21/6587* | (2011.01) |
| *H04N 21/25* | (2011.01) |
| *H04N 21/845* | (2011.01) |
| *H04N 21/8549* | (2011.01) |
| *H04N 5/76* | (2006.01) |
| *G06F 17/30* | (2006.01) |

(52) U.S. Cl.
CPC ..... *H04N 21/26283* (2013.01); *H04N 21/458* (2013.01); *H04N 21/4668* (2013.01); *H04N 21/47* (2013.01); *H04N 21/47202* (2013.01); *H04N 21/47214* (2013.01); *H04N 21/482* (2013.01); *H04N 21/4825* (2013.01); *H04N 21/4826* (2013.01); *H04N 21/4828* (2013.01); *H04N 21/6587* (2013.01); *H04N 21/8456* (2013.01); *H04N 21/8549* (2013.01)

(56) References Cited

U.S. PATENT DOCUMENTS

| | | | |
|---|---|---|---|
| 9,135,334 B2* | 9/2015 | Pickelsimer | G06F 17/30781 |
| 2003/0233656 A1* | 12/2003 | Sie et al. | 725/46 |
| 2005/0160458 A1* | 7/2005 | Baumgartner | 725/46 |
| 2010/0257561 A1* | 10/2010 | Maissel | H04N 5/44543 |
| | | | 725/41 |
| 2011/0145856 A1* | 6/2011 | Agarwal | G06Q 30/02 |
| | | | 725/32 |
| 2011/0247039 A1* | 10/2011 | Cheng | H04N 5/4403 |
| | | | 725/52 |

* cited by examiner

SYSTEMS AND METHODS OF PROVIDING A MEDIA-ON-DEMAND-BASED PROGRAMMING CHANNEL

RELATED APPLICATIONS

The present application claims priority under 35 U.S.C. § 119(e) to U.S. Provisional Patent Application No. 61/846,603, filed Jul. 15, 2013. The contents of the provisional patent application are hereby incorporated by reference in their entirety.

BACKGROUND INFORMATION

There are diverse ways for people to find and consume media programs. For example, a person wanting to watch a media program such as a movie may utilize a video distribution service such as a video rental or purchase service ("video service") to find, access, and watch a movie. The video service may allow the person to rent or purchase a physical copy of the movie from a local video store or video vending kiosk, or to rent or purchase a digital copy of the movie through an online video service, which may stream or download the digital copy of the movie to a user computing device for playback to the user.

A video service typically provides a set of service features and tools for use by an end user of the video service to interact with the video service to discover and utilize the features of the video service, such as features for discovering and accessing video programs for user consumption. While a conventional video service provides useful features and tools, there remains room for new and/or improved features and/or tools that may further benefit users of the service, a provider of the service, and/or third parties such as content providers and/or advertisers.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
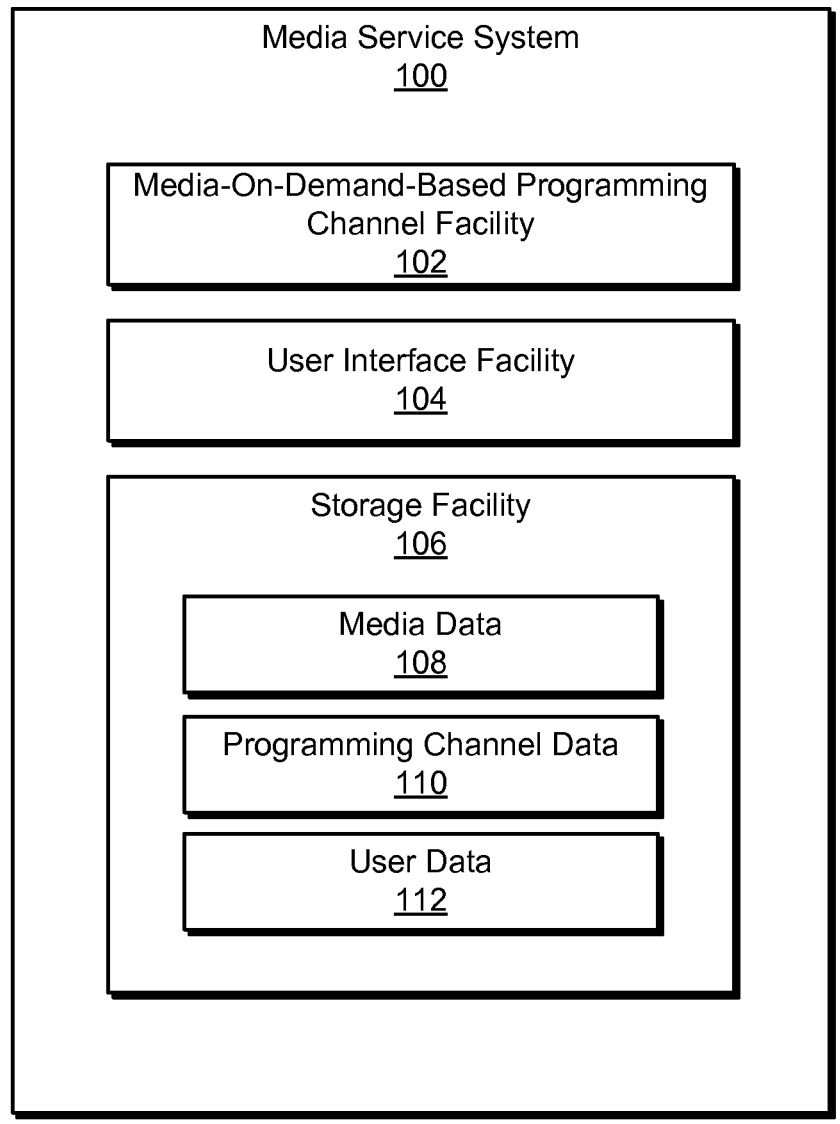
FIG. 1 illustrates an exemplary media service system according to principles described herein.

Examples of systems and methods of providing a media-on-demand-based programming channel are described herein. As used herein, a "programming channel" may refer to any virtual entity capable of being selected by an end user of a media service to access media content associated with the programming channel. For example, a programming channel may include a television programming channel that may be selected by an end user of a media service to access television programming content associated with (e.g., distributed by way of) the television programming channel.

A "media-on-demand-based programming channel" refers to a programming channel to which on-demand media content (e.g., a set of selected on-demand media programs) is mapped in accordance with a linear programming schedule for scheduled, linear playback in accordance with the linear programming schedule. The media-on-demand-based programming channel may be represented in a media service user interface so as to appear, from the perspective of an end user of the media service, to continually distribute the on-demand media content over time in accordance with the linear programming schedule. Accordingly, from the perspective of the end user of the media service, the distribution of the on-demand media content on the media-on-demand-based programming channel may appear to be "always on" during the linear programming schedule, and if the end user accesses the media-on-demand-based programming channel at a given time, a particular segment of a media program scheduled for distribution by way of the media-on-demand-based programming channel at that particular time is presented to the end user beginning at a playback position mapped to the given time in accordance with the linear programming schedule.

Systems and methods described herein may generate a media-on-demand-based programming channel in any of the ways described herein. For example, an exemplary system may 1) establish a set of conditions for a media-on-demand-based programming channel, 2) select, from a repository of on-demand media content and based on the set of conditions, a set of on-demand media programs for inclusion in the media-on-demand-based programming channel, and 3) map the selected set of on-demand media programs to the media-on-demand-based programming channel to represent a scheduled, linear playback of the set of on-demand media programs on the media-on-demand-based programming channel in accordance with a linear playback schedule.

Additionally or alternatively, systems and methods described herein may provide a user (e.g., an end user of a media service) with access to a media-on-demand-based programming channel in any of the ways described herein. For example, an exemplary system may publish the media-on-demand-based programming channel for access by one or more end users of a media service. When the media-on-demand-based programming channel is accessible to one or more end users of the media service, the exemplary system may 1) receive, at a particular time, a user request to access the media-on-demand-based programming channel, 2) determine a playback position within the media-on-demand-based programming channel that is mapped to the particular time, and 3) initiate, at the playback position, a playback of a media program included in the media-on-demand-based programming channel.

The systems and methods described herein may benefit end users of a media service, a provider of the media service, and/or one or more third parties (e.g., media content providers, advertisers, etc.). For example, one or more of the features and/or tools described herein may facilitate user-driven definition of custom media-on-demand-based programming channels and/or discovery and accessing of media content by way of media-on-demand-based programming channels. These and other benefits and/or advantages that may be provided by systems and methods described herein will be made apparent by the following detailed description. Exemplary systems and methods of providing a media-on-demand-based programming channel will now be described in reference to the accompanying drawings.

FIG. 1 illustrates an exemplary media service system 100 ("system 100") configured to provide a media service and/or one or more features of a media service to one or more end users of the media service (e.g., one or more subscribers to the media service). The media service may include any service that provides end users of the service with one or more features and/or tools configured to facilitate user discovery, access, and/or consumption of media content. System 100 may be associated with (e.g., operated by) a provider of the media service ("service provider").

As shown, system 100 may include, without limitation, a media-on-demand-based programming channel facility 102 ("programming channel facility 102"), a user interface facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. For example, programming channel facility 102 may be divided into any number of facilities configured to provide any number of media-on-demand-based programming channel features of a media service. Additionally or alternatively, one or more of the facilities 102-106 may be omitted from and/or external to system 100 in other implementations. For example, storage facility 108 may be external of and communicatively coupled to system 100 in certain alternative implementations. Facilities 102-106 of system 100 may include or be otherwise implemented by one or more computing devices configured to perform one or more of the operations described herein. In such implementations, system 100 may be referred to as a computer-implemented system 100.

Storage facility 106 may be configured to store data generated and/or used by programming channel facility 102 and/or user interface facility 104. For example, storage facility 106 may store media data 108 representative of media content that is discoverable and/or accessible through a media service. As used herein, the term "media content" may refer to any form of media that may be distributed through a media service and discovered, accessed, and/or consumed by a user of the media service. Media content may include discrete instances of media, which may be referred to as media programs. The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may access by way of the media service. Such media programs that are made available for user consumption through a media service may be accessed and/or played back by an appropriately configured user computing device (e.g., a media player device) for presentation to a user.

Media data 108 may represent actual content included in media content and/or information about the media content. For example, media data 108 may include metadata (e.g., information about genre, cast, title, playback duration, release date, etc.) and/or enriched metadata (e.g., user-defined tags, ratings, etc.) for the media content. In certain examples, media data 108 may represent information about media programs included in a repository of on-demand media content.

Storage facility 106 may include programming channel data 110 used and/or generated by programming channel facility 102. For example, programming channel data 110 may represent one or more media-on-demand-based programming channels generated by programming channel facility 102. Storage facility 106 may include user data 112 associated with one or more end users of a media service, such as data representing user profiles of the users. Storage facility 106 may store additional or alternative data as may serve a particular implementation.

Data stored by storage facility 106 may be accessed by system 100 from any suitable source, including a source internal or external to system 100. Storage facility 106 may permanently or temporarily store data. In certain examples, system 100 may access certain data from a source external to system 100 and temporarily store the data in storage facility 106 for use by programming channel facility 102 and/or user interface facility 104. In certain examples, data generated by programming channel facility 102 and/or user interface facility 104 may be stored permanently or temporarily to storage facility 106.

Programming channel facility 102 may be configured to perform one or more operations to provide one or more media-on-demand-based programming channels. For example, programming channel facility 102 may perform one or more operations to generate a media-on-demand-based programming channel and/or to provide access to the media-on-demand-based programming channel. Examples of such operations will now be described.

Programming channel facility 102 may be configured to generate a media-on-demand-based programming channel based on on-demand media content in any suitable way, including entirely automatically without user input dedicated to the generation of the programming channel and/or based at least in part on user input (e.g., user input dedicated to the generation of the programming channel and/or user input that is incidental to user interaction with the media service).

The generation of the media-on-demand-based programming channel may include programming channel facility 102 establishing a set of conditions (i.e., a set of one or more conditions) that govern how programming channel facility 102 populates the media-on-demand-based programming channel with on-demand media content. In certain examples, programming channel facility 102 may establish a set of conditions by receiving the set of conditions from a user such as a provider of a media service or an end user of the media service by way of a media service user interface. For example, an end user of the media service may utilize a condition definition tool of a media service user interface to define a set of conditions such as a set of one or more keywords for a media-on-demand-based programming channel. For instance, the user may provide input to specify that a tag keyword "weekend" is a condition to be considered by programming channel facility 102 when selecting media programs for inclusion in the media-on-demand-based programming channel. Programming channel facility 102 may then select media programs having user-defined tags that include the term "weekend" (e.g., a tag such as "watch on weekends" that has been associated with a media program by a user). In this or a similar manner, user-defined tags of media programs may be searched (e.g., for any keyword(s)) to identify media programs to associate with a media-on-demand-based programming channel. Examples of tools for use by a user to define a media-on-demand-based programming channel, including a set of conditions for the media-on-demand-based programming channel, are described herein.

In certain examples, programming channel facility 102 may establish a set of conditions for a media-on-demand-based programming channel by defining the set of conditions based on incidental user interaction with a media service. Incidental user interaction refers to user interaction with a media service that is incidental to using the media service and is not dedicated to or purposed for defining a media-on-demand-based programming channel. Programming channel facility 102 may be configured to define the set of conditions based on such incidental user interfaces, including historical incidental user interactions and/or patterns of such user interactions tracked over time. For instance, programming channel facility 102 may define a set of conditions for a media-on-demand-based programming channel to include a particular genre as a keyword based on a history of consumption of media programs of the same genre. Examples of user interactions with a media service that may be used as the bases for defining a set of conditions for a media-on-demand-based programming channel may include, without limitation, discovering media programs, accessing media programs (e.g., purchasing, renting, streaming, downloading, etc.), consuming media programs, tagging media programs, rating media programs, searching and/or browsing for media programs, adding media programs to a user's personalized media management feature (e.g., a wish list, playlist, check out list, and/or other feature or tool for user management of media content), and interacting with media service user interfaces (e.g., a media program guide, content menu, and/or other user interface of the media service).

A set of conditions for a media-on-demand-based programming channel may include any conditions potentially useful for identifying a set of media programs for the media-on-demand-based programming channel, such as any of the exemplary conditions described herein. In certain examples, the conditions may include the media curation logic defined for curation (e.g., selection) of media content associated with a particular theme. In certain examples, the conditions may include user attributes (e.g., information about a user or a type of user as specified in a user profile with the media service), user moods, media content filter settings (e.g., filter settings provided by a user to search or browse for media content), media content search parameters, popularity of media programs (e.g., most-accessed media programs within a time period), additions of media programs to an on-demand media content repository (e.g., new releases), and any other conditions that may be used to select media programs having attributes that match the conditions.

In certain examples, an established set of conditions for a media-on-demand-based programming channel may be referred to as a channel generation heuristic for the media-on-demand-based programming channel. The set of conditions specified by the channel generation heuristic for a media-on-demand-based programming channel may be used by programming channel facility 102 to curate on-demand media programs to be associated with the media-on-demand-based programming channel. The curation may include programming channel facility 102 selecting, from a repository of on-demand media programs and based on the set of conditions, a set of on-demand media programs for inclusion in the media-on-demand-based programming channel. The selecting may include programming channel facility 102 prioritizing and/or filtering on-demand media programs based on the set of conditions and/or one or more other predefined selection conditions to determine the set of on-demand media programs to be included in the media-on-demand-based programming channel. For example, the set of conditions may include a set of one or more keywords, and programming channel facility 102 may select a set of on-demand media programs for inclusion in the media-on-demand-based programming channel by searching a repository of on-demand media content for media programs associated with the set of one or more keywords (e.g., by searching metadata and/or enriched metadata for the media programs to find matches to the keywords).

The curation may further include programming channel facility 102 associating the selected set of on-demand media programs with the media-on-demand-based programming channel. For example, programming channel facility 102 may map the set of on-demand media programs to the media-on-demand-based programming channel such that the on-demand media programs are organized for scheduled, linear playback on the media-on-demand-based programming channel in accordance with a linear playback schedule. The mapping may include programming channel facility 102 linearly serializing the set of on-demand media programs relative to a time axis of the linear playback schedule. In certain examples, programming channel facility 102 may select a beginning time for the time axis (e.g., a time selected by a user or a time of creation of the media-on-demand-based programming channel) and map times along the time axis to temporal playback positions within the media programs associated with the media-on-demand-based programming channel. Accordingly, data representative of the media-on-demand-based programming channel may include indexing information that specifies and/or may be used to determine a particular playback position for any particular time along the time axis.

Programming channel facility 102 may organize and map the selected media programs to the media-on-demand-based programming channel in any suitable way. For example, programming channel facility 102 may organize the selected media programs randomly (e.g., in a random order), based on certain predefined organization conditions (e.g., by popularity of the media programs and/or level of relevance to the selection conditions), based on user input (e.g., user input selecting or modifying an order of the media programs), or based on any combination or sub-combination of such conditions. In certain examples, the selected media programs may be organized into a playlist block of media programs, which may be configured to repeat in a recurring schedule (e.g., by days of a week, time of day, after playback of the block finishes, etc.). In certain examples, programming channel facility 102 may form blocks of media programs on a media-on-demand-based programming channel in a manner that groups popular media programs with new or less popular media programs, which grouping may be designed to promote the new or less popular media programs (e.g., to a specific demographic of users).

Scheduled, linear playback of media programs on a media-on-demand-based programming channel in accordance with a linear playback schedule refers to scheduled playback of the media programs on the media-on-demand-based programming channel in accordance with a mapping of the media programs to a time axis representative of a period of real time. In other words, a linear playback schedule defines a scheduled playback of the media program in terms of real dates and/or times. Accordingly, for any given date and time along the time axis, the linear playback schedule indicates an exact playback position within the set of linearly ordered media programs.

The generation of a media-on-demand-based programming channel may include programming channel facility 102 programming channel facility 102 generating a data structure (e.g., which may include a single data structure or set of data structures) representing the media-on-demand-based programming channel. The data structure may be of any suitable form and may be represented in programming channel data 110 of storage facility 106. The data structure may include any data representative of the media-on-demand-based programming channel. As an example, the data structure may include data representative of the set of conditions used by programming channel facility 102 to curate media content for association with the media-on-demand-based programming channel. As another example, in certain implementations, data structure may include a manifest of information about the content of the media-on-demand-based programming channel. For example, a text file may be generated by programming channel facility 102 and may include a manifest of information specifying the media programs associated with the media-on-demand-based programming channel and mappings of the media programs to a linear playback time schedule for the media-on-demand-based programming channel (e.g., indexing information representative of mappings of playback positions of the media programs to temporal positions along a time axis). As another example, the manifest may include information indicating where and/or how data representative of the media programs may be accessed for on-demand playback.

Figure 2:
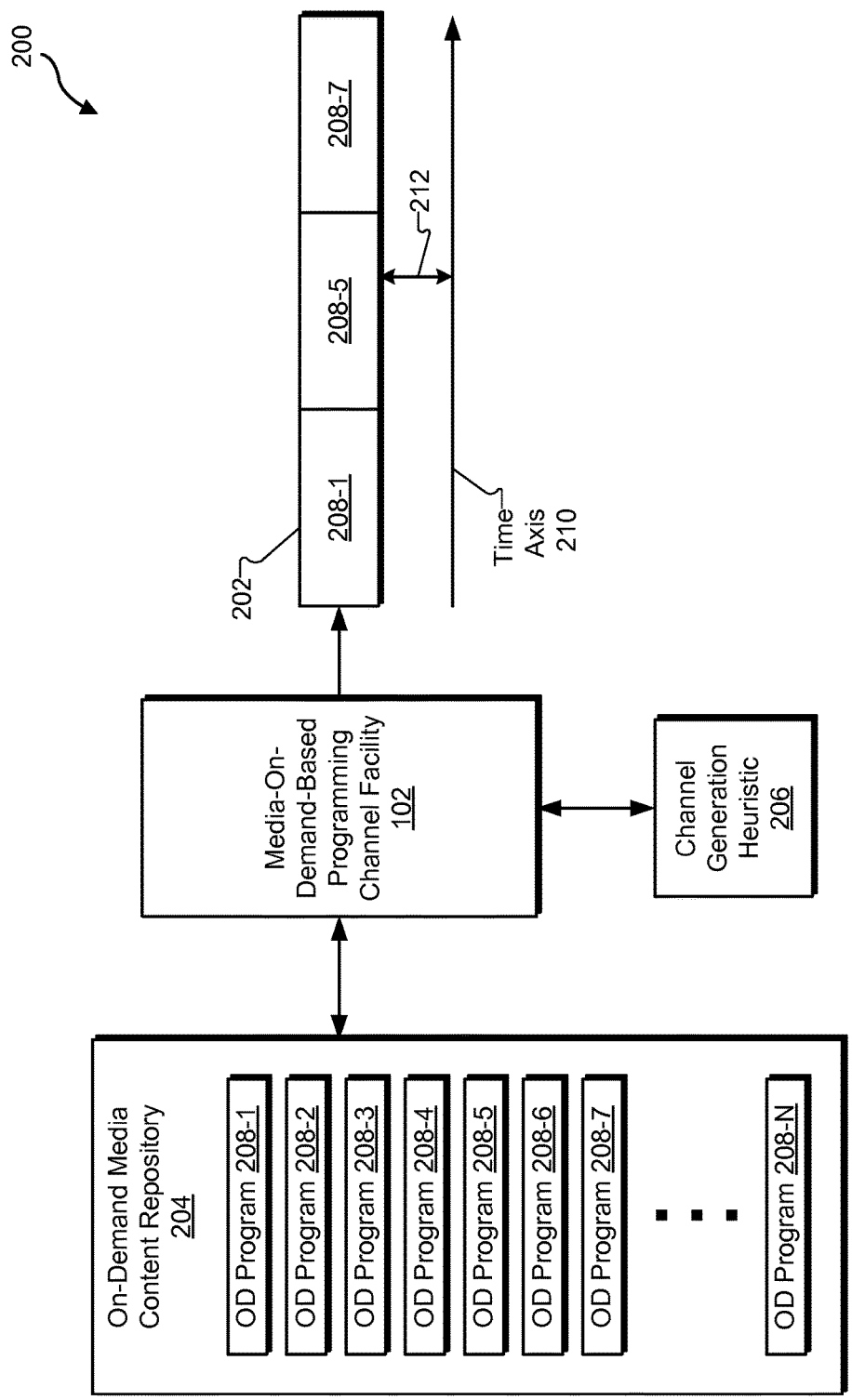
FIG. 2 illustrates an example of a generation of a media-on-demand-based programming channel according to principles described herein.

FIG. 2 illustrates an example of a generation 200 of a media-on-demand-based "always-on" programming channel 202 ("programming channel 202"). As illustrated, programming channel facility 102 may be in communication with or otherwise have access to an on-demand media content repository 204 and a channel generation heuristic 206. Repository 204 may contain data representative of a library of on-demand ("OD") media programs 208 (e.g., programs 208-1 through 208-N). Programming channel facility 102 may use channel generation heuristic 206 (e.g., a set of conditions specified by the channel generation heuristic 206) and information about media programs 208 included in repository 204 (e.g., information specified by media data 108) to select one or more of the media programs 208 to associate with programming channel 202. Programming channel facility 102 may populate programming channel 202 with a set of the selected media programs 208 based on the channel generation heuristic 206. In the illustrated example, programming channel facility 102 has selected and populated programming channel 202 with on-demand media programs 208-1, 208-5, and 208-7, which are serialized linearly relative to a time axis 210 to form a linear playback schedule such that on-demand media program 208-1 is scheduled for playback, followed by playback of on-demand media program 208-5, followed by playback of on-demand media program 208-7 as time passes along time axis 210.

Programming channel facility 102 may map the selected on-demand media programs 208-1, 208-5, and 208-7 to the programming channel 202 to reflect the linear playback schedule in any suitable way. Arrow 212 illustrates a mapping of a particular playback position within media program 208-5 to a particular time on time axis 210. Such a mapping and other mappings may be represented by programming channel facility 102 in any suitable way. For example, programming channel facility 102 may add data representative of the linear playback schedule for the programming channel 202 to a data structure representative of the programming channel 202. The data may specify the selected on-demand media programs 208-1, 208-5, and 208-7, data locations (e.g., memory addresses) at which the on-demand media programs 208-1, 208-5, and 208-7 are accessible, indexing information for the on-demand media programs 208-1, 208-5, and 208-7 such that the index information may be used to access each on-demand media program at any playback position within the on-demand media program, information mapping media program index information (e.g., playback positions) to times of the playback schedule for the programming channel 202, and/or any other information useful for initiating playback of any of the on-demand media programs 208-1, 208-5, and 208-7 at any particular playback position in accordance with the playback schedule of the programming channel 202.

For example, a user may provide input to a user computing device to request access to the programming channel 202 with the user computing device. The access request may be made at a particular time along time axis 210. Programming channel facility 102 may receive the request and use index information in the data structure for the programming channel 202 to determine a particular playback position within a particular on-demand media program associated with the programming channel 202 that is mapped to the time of the access request and initiate playback of the on-demand media program starting at that playback position. Programming channel facility 102 may perform these operations in a manner designed to give an appearance to the user that the user has joined an in-progress "always on" playback of media content associated with the programming channel 202, even though programming channel facility 102 does not actually continually distribute or play back the media programs associated with the programming channel 202 in accordance with the playback schedule.

Programming channel facility 102 may be configured to provide user access to a media-on-demand-based programming channel. As an example, programming channel facility 102 may publish the media-on-demand-based programming channel such that the media-on-demand-based programming channel becomes accessible to one or more end users of a media service. The publishing may be performed in any way suitable to make the media-on-demand-based programming channel accessible through the media service.

A published media-on-demand-based programming channel may be represented in a media service user interface for access by one or more end users of the media service. To this end, programming channel facility 102 may provide data representative of the media-on-demand-based programming channel for use by user interface facility 104 to generate and provide a media service user interface that includes user interface content representative of the media-on-demand-based programming channel. A published media-on-demand-based programming channel may be selected by an end user of a media service to access playback of media content associated with the media-on-demand-based programming channel. Examples of such ways of providing access to a media-on-demand-based programming channel will now be described.

Returning to FIG. 1, user interface facility 104 may be configured to perform one or more operations to provide one or more user interfaces associated with a media service. For example, user interface facility 104 may be configured to provide a user interface through which users of the media service may access and interface with the media service to discover, access, and consume media programs. The user interface may be in any suitable form. For example, user interface facility 104 may be configured to provide a website, a client application user interface (e.g., a user interface provided by a client application such as a "mobile app" installed and running on a user computing system), a media player user interface, a graphical user interface, and/or any other form of user interface configured to facilitate interaction with the media service. A user interface provided by user interface facility 104 may include one or more features and/or tools of the media service, including any of the exemplary features and/or tools described herein.

User interface facility 104 may be configured to provide a user interface in which one or more media-on-demand-based programming channels generated by programming channel facility 102 are represented and are accessible by an end user of a media service. A media-on-demand-based programming channel may be represented in any suitable way in a media service user interface, including in any way designed to create an appearance that media content associated with the media-on-demand-based programming channel is always on, meaning that media content associated with the media-on-demand-based programming channel appears to be continually distributed and/or played back in accordance with a linear playback time schedule. To this end, programming channel facility 102 may provide data and/or user interface content representative of or otherwise associated with a media-on-demand-based programming channel to user interface facility 104 for use by user interface facility 104 to populate a media service user interface with user interface content representative of the media-on-demand-based programming channel. Examples of graphical user interfaces that may be provided by user interface facility 104 for display and may include user interface content representing media-on-demand-based programming channels will now be described.

In certain examples, a media service user interface may include an electronic program guide ("EPG") user interface that visually represents one or more media-on-demand-based programming channels generated by programming channel facility 102, media content associated with the channels, and linear playback schedules of the media content associated with the channels.

Figure 3:
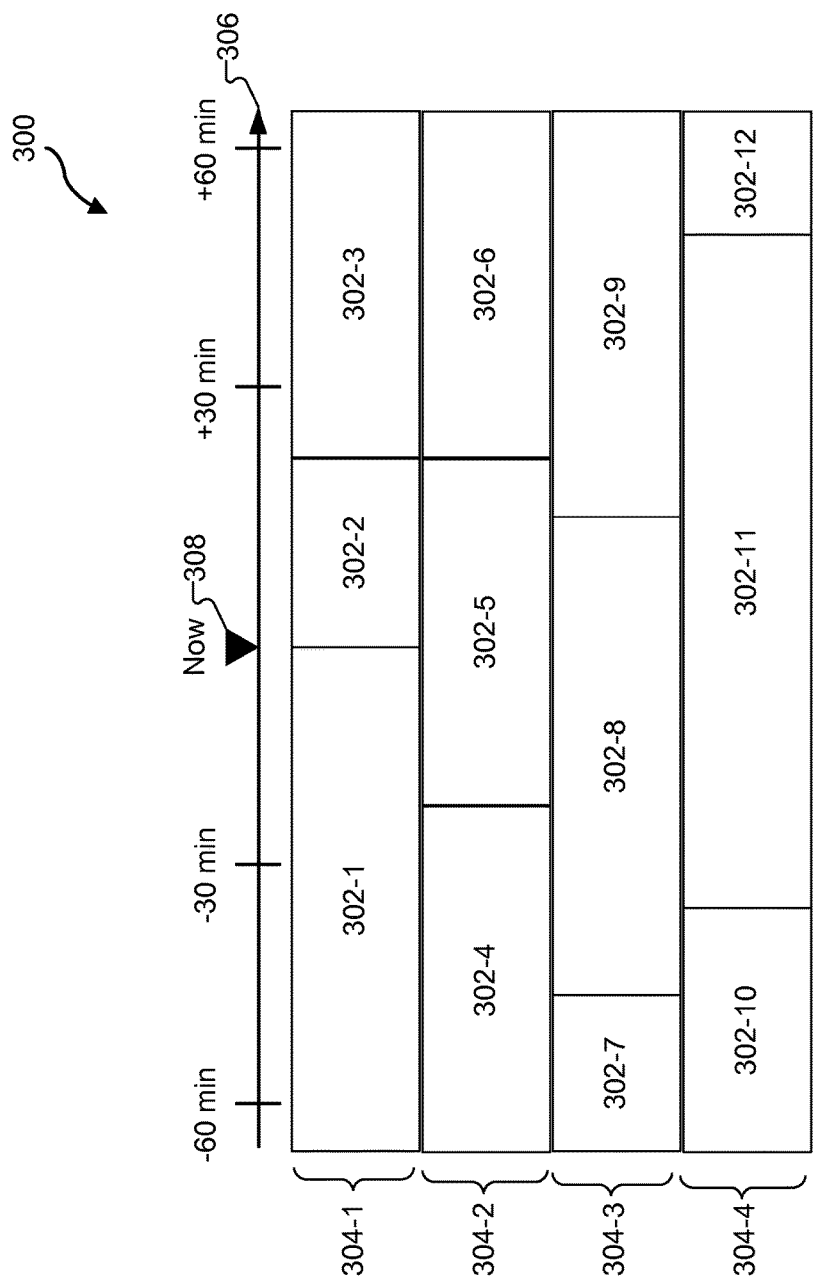
FIGS. 3-7 illustrate exemplary views of graphical user interfaces according to principles described herein.

To illustrate, FIG. 3 shows an exemplary graphical user interface view of a program guide 300 that may be generated and presented by user interface facility 104 within an EPG user interface. As shown, program guide 300 may include a matrix of cells 302-1 through 302-12 (collectively "cells 302") organized into a plurality of rows 304-1 through 304-4 (collectively "rows 304"). Each row 304 may be representative of a media-on-demand-based programming channel. Each cell 302 included in a particular row 304 is representative of a media program included in a media-on-demand-based programming channel associated with the particular row 304. For example, media programs represented by cells 302-1 through 302-3 are included in a media-on-demand-based programming channel represented by row 304-1.

As shown, cells 302 may be arranged along a time axis 306. Because the media programs represented by cells 302 are on-demand media programs, time axis 306 may be relative in the sense that it indicates a current playback time (e.g., with indicator 308) and periods of time relative to the current playback time (e.g., +30 minutes and +60 minutes represent 30 minutes and 60 minutes, respectively, of playback time subsequent to the current playback time, and −30 minutes and −60 minutes represent 30 minutes and 60 minutes, respectively, of playback time previous to the current playback time). In this arrangement, a user may readily see what media programs are included in a plurality of different media-on-demand-based programming channels and how long each media program is relative to other media programs included in the different media-on-demand-based programming channels. Time axis 306 may represent a real period of time in terms of real dates and times, as described herein, such that any time of day along time axis 306 is mapped to particular playback positions on each of the media-on-demand-based programming channels in accordance with a linear playback schedule.

In some examples, a user may interact with program guide 300 to access information associated with the media programs represented by cells 302, select a media program and/or a media-on-demand-based programming channel for viewing, and/or otherwise access media programs and/or media-on-demand-based programming channels represented in program guide 300. For example, a user may select cell 302-5 to direct system 100 to switch to the media-on-demand-based programming channel represented by row 304-2 and begin presenting the media program represented by cell 302-5. In some examples, the presentation may begin at a temporal position within the media program that corresponds to where the current playback time indicator 308 is positioned. To illustrate, in the example of FIG. 3, the presentation may begin at a temporal position that is about half way through the media program represented by cell 302-5. The user may subsequently provide a "channel up" command. In response, system 100 may automatically switch to the media-on-demand-based programming channel represented by row 304-3 and begin presenting the media program represented by cell 302-8 starting at a temporal position within the media program that is mapped to the current playback time indicated by indicator 308. In this manner, the user may experience on-demand media programs in a similar manner to that associated with live television content (e.g., scheduled linear broadcasts of television content on different television programming channels).

Program guide 300 may visually represent that media content associated with a media-on-demand-based programming channel is continually being played back in accordance with a linear playback time schedule. However, while system 100 may create an appearance that media content associated with a media-on-demand-based programming channel is continually being distributed and/or played back in accordance with a linear time schedule, the media content associated with the channel may not actually be continually distributed and/or played back in accordance with the linear time schedule. Rather, media content may be distributed and/or played back on-demand as accessed. This may conserve network resources and/or processing resources while also giving an end user of the media service an interface that is intuitive and/or familiar to the user. The "always-on" appearance may help create user interest in one or more on-demand media programs.

Figure 4:
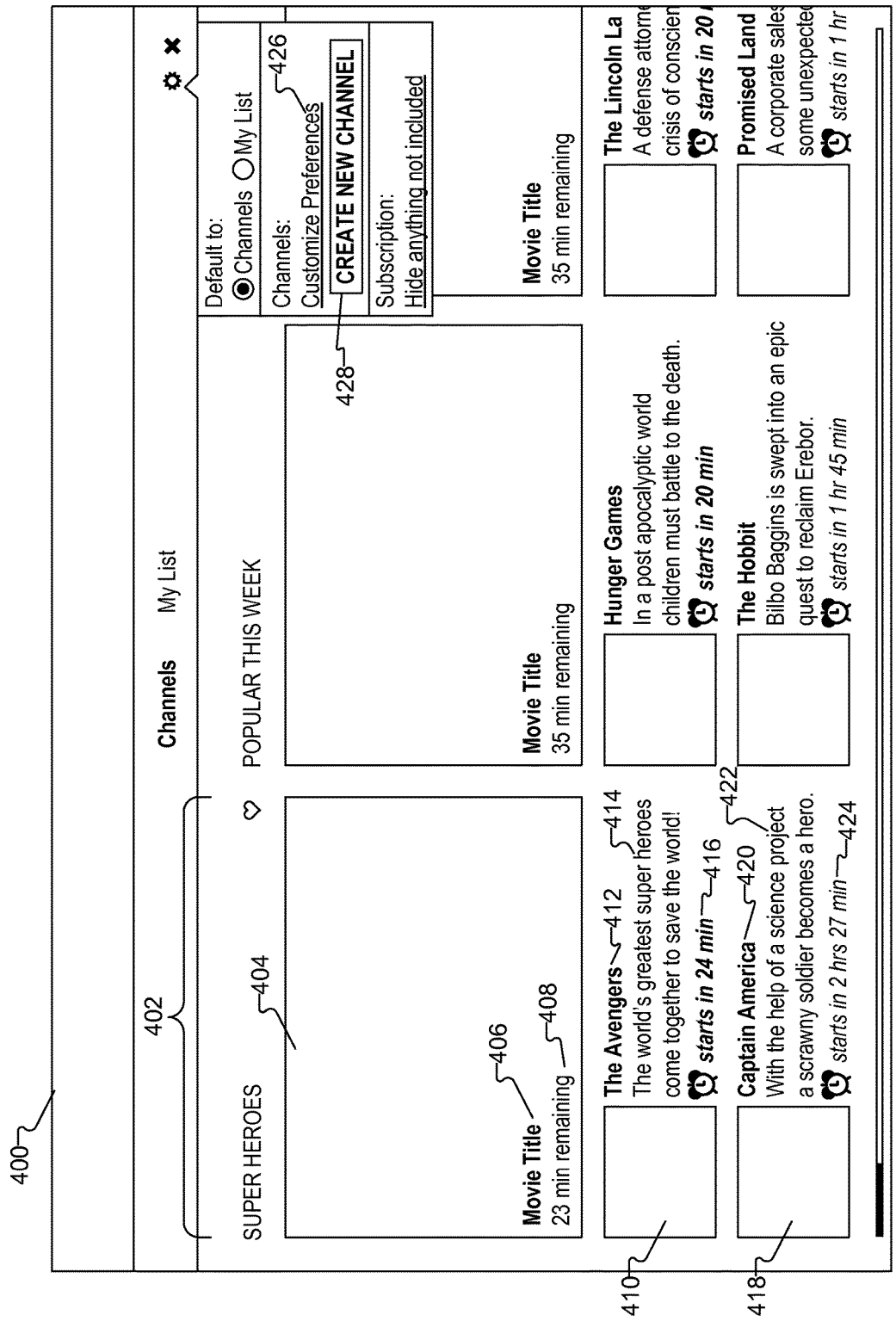

FIG. 4 illustrates another example of a media service user interface that visually represents one or more media-on-demand-based programming channels generated by programming channel facility 102. As shown, the media service user interface may include a graphical user interface view 400 ("view 400") that includes user interface content visually representing media-on-demand-based programming channels that have been generated by programming channel facility 102. In FIG. 4, a media-on-demand-based programming channel titled "Super Heroes" is represented in a channel area 402. In the illustrated example, the channel area 402 includes user interface content visually representing media programs associated with the media-on-demand-based programming channel and a playback time schedule of the media programs on the media-on-demand-based programming channel. For example, the channel area 402 includes a cover art image 404 and title 406 of a first media program that is scheduled for playback during a period of time that spans the current time at which the user is viewing view 400. Channel area 402 also includes an indication 408 indicating an amount of time (e.g., 23 minutes) remaining from the current time until the scheduled playback of the first media program concludes.

In addition, channel area 402 includes a cover art image 410, a title 412, and a brief synopsis 414 of a second media program that is scheduled for playback following the playback of the first media program on the media-on-demand-based programming channel. Channel area 402 also includes an indication 416 indicating an amount of time (e.g., 24 minutes) remaining from the current time until the scheduled playback of the second media program begins (e.g., one minute after the scheduled conclusion of the first media program) on the media-on-demand-based programming channel.

In addition, channel area 402 includes a cover art image 418, a title 420, and a brief synopsis 422 of a third media program that is scheduled for playback following the playback of the second media program on the media-on-demand-based programming channel. Channel area 402 also includes an indication 424 indicating an amount of time (e.g., 2 hours and 27 minutes) remaining from the current time until the scheduled playback of the third media program begins on the media-on-demand-based programming channel.

In certain examples, a user may scroll downward in view 400 to access user interface content representing additional media programs scheduled for subsequent playback on the media-on-demand-based programming channel represented in channel area 402. In view 400, additional media-on-demand-based programming channels (e.g., a media-on-demand-based programming channel titled "Popular This Week") are visually and similarly represented in other channel areas.

View 400 may visually represent that media content associated with a media-on-demand-based programming channel is continually being played back in accordance with a linear playback time schedule. For example, by indicating specific lengths of time until the conclusions and/or beginnings of scheduled playbacks of media programs, view 400 creates an appearance that the media programs on the media-on-demand-based programming channels is always on and being continually played back in accordance with the linear playback time schedule.

In certain examples, a user may provide input to view 400 to request access to a media-on-demand-based programming channel and/or media program associated with a media-on-demand-based programming channel. The request may be received at a particular time that corresponds to a current time. In response, programming channel facility 102 may initiate playback of a media program at a temporal position that is mapped to the current time. The playback may be initiated at the playback position in any suitable way, such as by programming channel facility 102 determining the playback position within the media-on-demand-based programming channel that is mapped to the current time, accessing a media program associated with the playback position, and initiating playback of the media program at the playback position, such as described herein. Alternatively, in response to the access request, user interface facility 104 may provide an information view for a media-on-demand-based programming channel and/or a media program. From the information view, a user may initiate on-demand access and playback of a media program starting at the beginning of the media program.

The media-on-demand-based programming channels visually represented in view 400 may be media-on-demand-based programming channels generated by programming channel facility 102 based on input received from a user. For certain media-on-demand-based programming channels, the input may be received from a provider of a media service. Such media-on-demand-based programming channels may be referred to as "provider-defined" media-on-demand-based programming channels. For other media-on-demand-based programming channels, the input may be received from an end user of a media service. Such media-on-demand-based programming channels may be referred to as "end-user-defined" media-on-demand-based programming channels.

User interface facility 104 may provide one or more tools for use by an end user of a media service to define a media-on-demand-based programming channel. For example, user interface facility 104 may provide one or more tools for use by the user to define a set of conditions to be used by programming channel facility 102 to generate a custom media-on-demand-based programming channel. To illustrate, FIG. 4 shows that view 400 may include user-selectable options for managing media-on-demand-based programming channels. For example, view 400 may include an option 426 for selection by a user to access one or more tools usable by the user to customize preferences related to published media-on-demand-based programming channels generally or specifically. View 400 may additionally or alternatively include an option 428 for selection by the user to access one or more tools usable by the user to define a new media-on-demand-based programming channel (e.g., by providing input to be used by programming channel facility 102 to generate the new media-on-demand-based programming channel).

Figure 5:
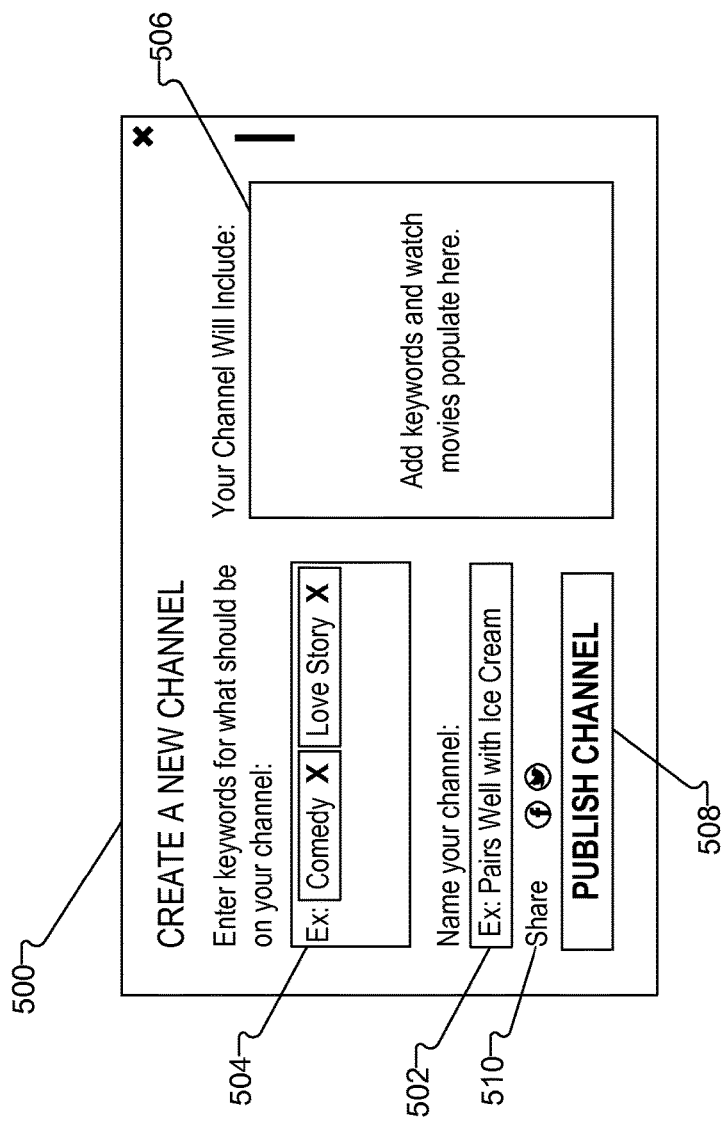

FIG. 5 illustrates a graphical user interface view 500 ("view 500") that includes tools for use by the user to define a new media-on-demand-based programming channel. As shown, view 500 may include a name tool 502 usable by the user to provide a name for the new media-on-demand-based programming channel. View 500 may further include a condition definition tool 504 usable by the user to provide input to define a set of conditions to be used by programming channel facility 102 to curate media content for the new media-on-demand-based programming channel. In the illustrated example, condition definition tool 504 is configured to facilitate user input of one or more keywords to be used as search terms to identify, from a repository of on-demand media content, matching media programs for inclusion in the new media-on-demand-based programming channel. In certain examples, condition definition tool 504 may initially include keyword suggestions (e.g., "Comedy" and "Love Story," as shown) for the user. The suggestions may be selected by programming channel facility 102 based on any suitable factors (e.g., historical user interactions with a media service) and may be automatically removed when the user provides input using condition definition tool 504.

View 500 may further include a channel preview tool 506, which may be populated with user interface content representing media programs selected by programming channel facility 102 for inclusion in the new media-on-demand-based programming channel. In certain examples, channel preview tool 506 may be populated with such content in real-time or near real-time as programming channel facility 102 selects media programs for inclusion in the new media-on-demand-based programming channel based on conditions input by the user using condition definition tool 504. Accordingly, an update to the keywords in condition definition tool 504 may cause a real-time or near real-time update to the media programs represented in channel preview tool 506.

Figure 6:
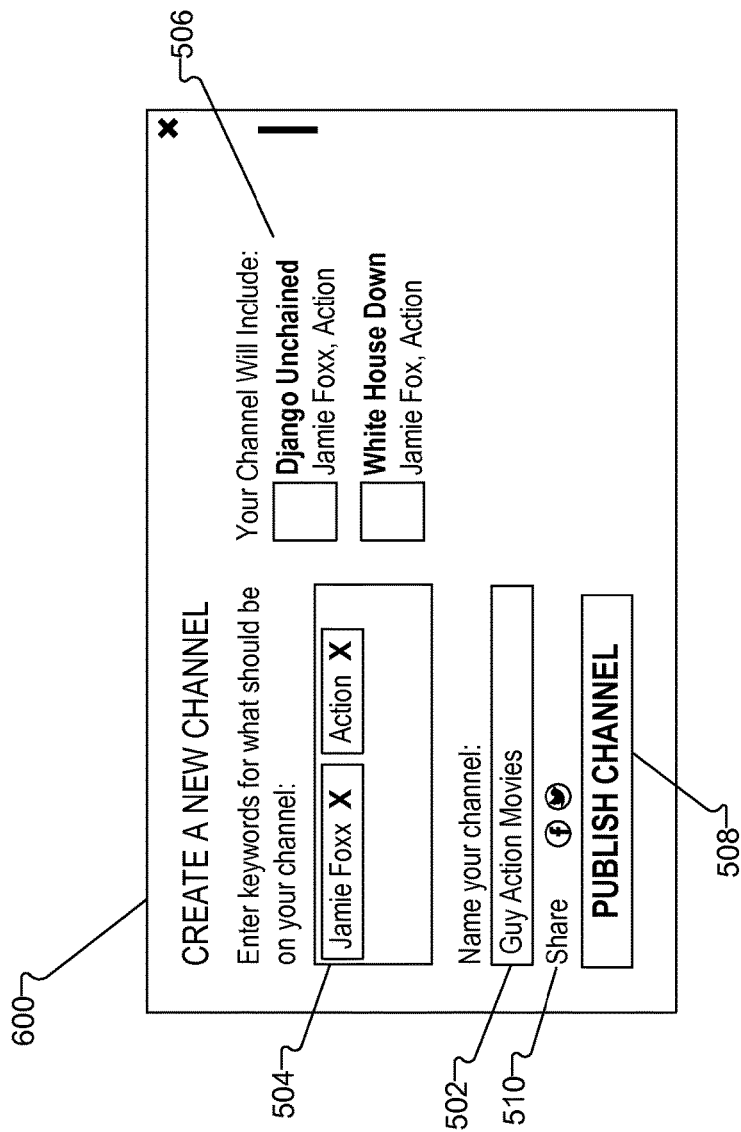

FIG. 6 illustrates a graphical user interface view 600 ("view 600") that may be displayed in response to the user utilizing name tool 502 to provide a name (e.g., "Guy Action Movies") for the new media-on-demand-based programming channel and condition definition tool 504 to provide keywords (e.g., keywords such as "Jamie Fox" and "Action") for use by programming channel facility 102 to curate media programs for the new media-on-demand-based programming channel. Programming channel facility 102 may receive the user input and, in response, select a set of on-demand media programs for inclusion in the new media-on-demand-based programming channel based on the keywords. The selected set of on-demand media programs may be visually represented in channel preview tool 506 as shown in FIG. 6.

In certain examples, programming channel facility 102 may initially order the selected on-demand media programs based on one or more predefined organization conditions. For example, in FIG. 6, the on-demand media programs represented in channel preview tool 506 are ordered based on strength of relevance to the keywords entered in condition definition tool 504. In the illustrated example, channel preview tool 506 visually indicates which of the keywords specified in condition definition tool 504 are associated with each of the media programs represented in channel preview tool 506, which may visually indicate the strength of relevance of each media program to the set of keywords.

In certain examples, user interface facility 104 may provide one or more tools for use by the user to modify a set of on-demand media programs represented in channel preview tool 506. For example, a user may provide input to rearrange the order of the media programs in the list (e.g., by dragging and dropping a media program cover art image at a different position in the list), to delete a media program from the list, and/or to add another media program to the list.

As shown in FIGS. 5-6, a channel publication tool 508 may be provided. A user may select channel publication tool 508 to cause the new media-on-demand-based programming channel as currently represented in channel preview tool 506 to be published by programming channel facility 102. In response, programming channel facility 102 may publish the new media-on-demand-based programming channel such that the new media-on-demand-based programming channel becomes accessible by the user and/or one or more other end users of a media service.

Figure 7:
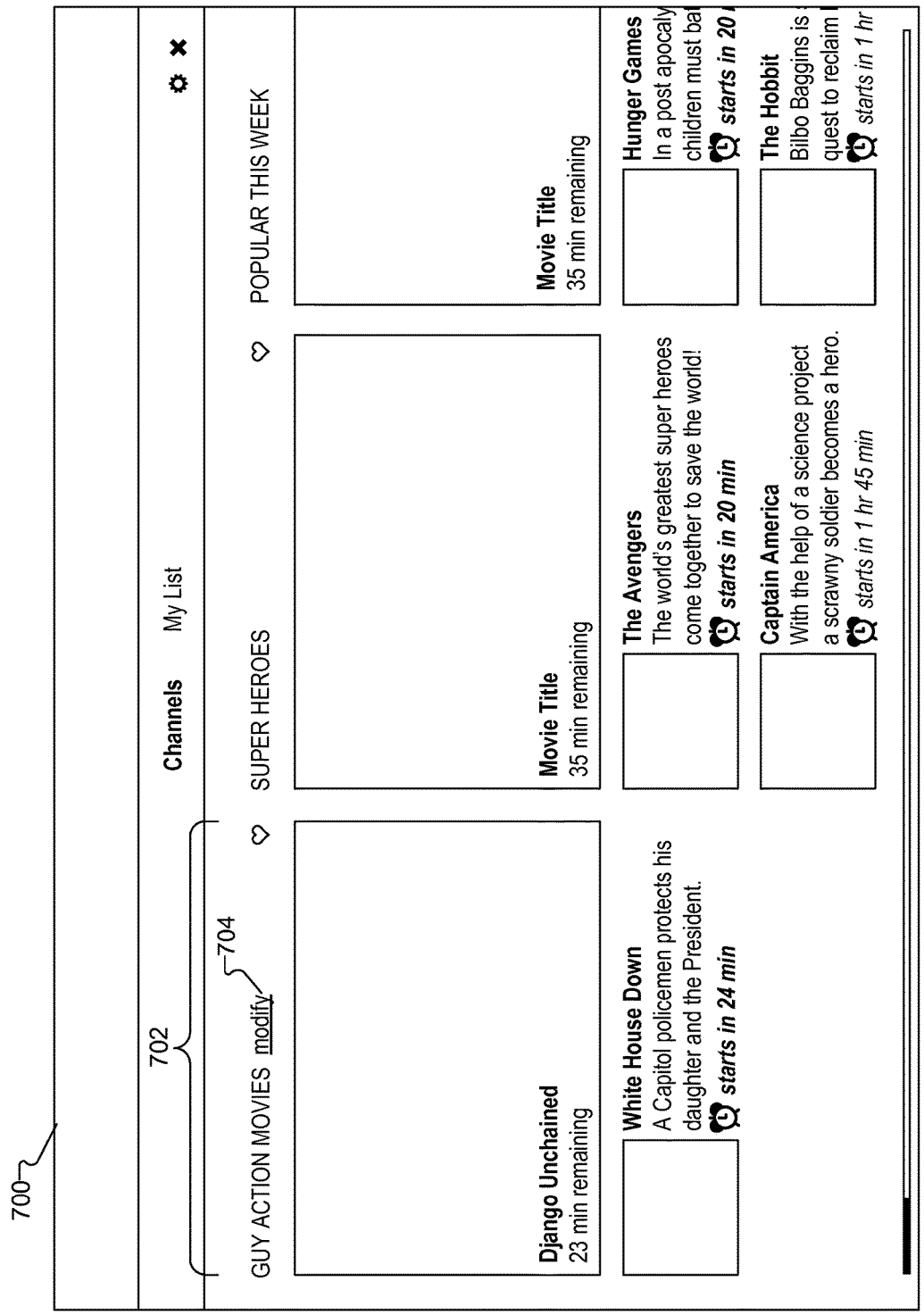

After programming channel facility 102 publishes the new media-on-demand-based programming channel, the new media-on-demand-based programming channel is accessible by the user and may be visually represented in one or more media service user interface for access by the user. FIG. 7 illustrates a graphical user interface view 700 ("view 700") that may be displayed and that includes user interface content visually representing media-on-demand-based programming channels that have been generated by programming channel facility 102. In FIG. 7, the new media-on-demand-based programming channel is represented in a channel area 702 and is titled "Guy Action Movies." In the illustrated example, the channel area 702 includes user interface content visually representing media programs associated with the new media-on-demand-based programming channel and a playback time schedule of the media programs on the new media-on-demand-based programming channel.

As shown in FIG. 7, channel area 702 may further include an option 704 configured to be selected by the user who defined the new media-on-demand-based programming channel to access one or more tools for use by the user to modify the new media-on-demand-based programming channel. For example, in response to a user selection of option 704, user interface facility 104 may provide view 600 for display to facilitate user modification of the keywords and/or list of on-demand media programs associated with the new media-on-demand-based programming channel.

In certain examples, user interface facility 104 may be configured to provide one or more tools for use by a user to modify a media-on-demand-based programming channel not originally created by the user. Such tools may be accessed by the user from any suitable user interface context. For example, user interface facility 104 may provide a user interface view including user interface content representing a media-on-demand-based programming channel. The user interface view may also include an option selectable by a user to indicate that the user wants to modify the media-on-demand-based programming channel and to access one or more tools for use by the user to modify the media-on-demand-based programming channel. The tools may facilitate any suitable modification of the media-on-demand-based programming channel, such as a removal of a media program, an addition of a media program, a reordering of a media program, a removal of a keyword (e.g., a tag attribute) from the channel definition, an addition of a keyword to the channel definition, a reprioritization of keyword priorities or weighting in the channel definition, and/or any other change that may be made by a user to customize a pre-existing media-on-demand-based programming channel.

In certain examples, user interface facility 104 may be configured to provide one or more tools for use by a user to modify, within a graphical user interface view such as view 300, 400, or 700, a defined playback schedule of media programs associated with a media-on-demand-based programming channel. For example, the user may provide input (e.g., drag and drop touch screen input) to reorder media programs associated with a media-on-demand-based programming channel, thereby reordering the playback schedule of the media programs associated with the media-on-demand-based programming channel. Programming channel facility 102 may update data representative of the media-on-demand-based programming channel accordingly.

In certain examples, programming channel facility 102 may be configured to update a published media-on-demand-based programming channel in response to a user request to update the media-on-demand-based programming channel or in response to an occurrence of another predefined event. For example, programming channel facility 102 may be configured to add a newly accessible media program (e.g., a new release in a library of on-demand media programs) to the media-on-demand-based programming channel and/or delete a media program that is no longer accessible (e.g., a media program that has been removed from the library of on-demand media programs).

In certain examples, programming channel facility 102 may facilitate sharing of a media-on-demand-based programming channel between users. As an example, a user who created the media-on-demand-based programming channel may provide input to direct programming channel facility 102 to share the media-on-demand-based programming channel with one or more specific people. For instance, the user may provide input directing programming channel facility 102 to share the media-on-demand-based programming channel with another specific user of the media service. As another example, a user who created the media-on-demand-based programming channel may provide input to direct programming channel facility 102 to share the media-on-demand-based programming channel through a social networking service. For instance, the user may provide input directing programming channel facility 102 to post the media-on-demand-based programming channel and/or information about the media-on-demand-based programming channel to the social networking service.

As shown in FIGS. 5-6, a channel share tool 510 may be provided. A user may select the channel share tool 510 to access one or more options for sharing the media-on-demand-based programming channel with one or more specific people indicated by the user and/or through a social network service (e.g., FACEBOOK or TWITTER). These examples of tools for sharing the media-on-demand-based programming channel are illustrative only. System 100 may provide other tools for other sharing of the media-on-demand-based programming channel in other examples.

As mentioned, if a user accesses a media-on-demand-based programming channel at a given time (e.g., by selecting, in a user interface view, the media-on-demand-based programming channel or a particular media program mapped to the media-on-demand programming channel), a particular segment of a media program scheduled for distribution by way of the media-on-demand-based programming channel at that particular time may be presented to the user beginning at a playback position mapped to the given time in accordance with the linear programming schedule. Playback may progress with the passage of time such that media programs mapped to the media-on-demand-based programming channel continue to be played back in accordance with the linear programming schedule of the media-on-demand-based programming channel.

Additionally or alternatively, system 100 (e.g., programming channel facility 102 and/or user interface facility 104) may provide one or more tools for use by the user to otherwise interact with a media-on-demand-based programming channel and/or a particular media program mapped to the media-on-demand programming channel. For example, system 100 may provide one or more tools for use by the user to access a media program mapped to the media-on-demand-based programming channel on-demand rather than in accordance with the linear programming schedule of the media-on-demand-based programming channel.

As an example, system 100 may provide an option configured to be selected by the user to play back a media program mapped to the media-on-demand-based programming channel starting at the beginning of the media program. The option may be provided in any suitable way, such as by way of a pop-up window in a user interface view in which the media-on-demand-based programming channel is represented, or in response to dedicated user input mapped to the option. Accordingly, the user may user the option to select, from a visual representation of the media-on-demand-based programming channel, to access a media program mapped to the media-on-demand-based programming channel on-demand.

In certain examples, in response to a user selection of a media-on-demand-based programming channel in a user interface view, system 100 may start playing back a particular segment of a media program scheduled for distribution by way of the media-on-demand-based programming channel at that particular time beginning at a playback position mapped to the given time associated with the user selection in accordance with the linear programming schedule, as described herein. System 100 may provide a tool for use by the user to manually move the playback position backward or forward in time, including to the beginning of any media program mapped to the media-on-demand-based programming channel in order to begin playback of at the beginning of the media program. For example, the user may manually move a play-head indicator backward or forward in time along a time axis to any position in the linear programming schedule of the media-on-demand-based programming channel.

In any of these ways, or in alternative ways, system 100 may provide one or more tools for use by a user to access any media program mapped to a media-on-demand-based programming channel on-demand rather than in accordance with the linear programming schedule of the media-on-demand-based programming channel. Additionally or alternatively, system 100 may provide one or more tools for user interactions with on-demand content that originate from a user interface view in which a media-on-demand-based programming channel is represented. For example, from such a view, system 100 may provide a tool for use by the user to add a media program included in the media-on-demand-based programming channel to a personalized list of media programs (e.g., a playlist, watch list, bookmark list, etc.).

System 100 may be embodied in any suitable implementation as may suit a particular application of principles described herein. To illustrate, examples of such implementations will now be described.

Figure 8:
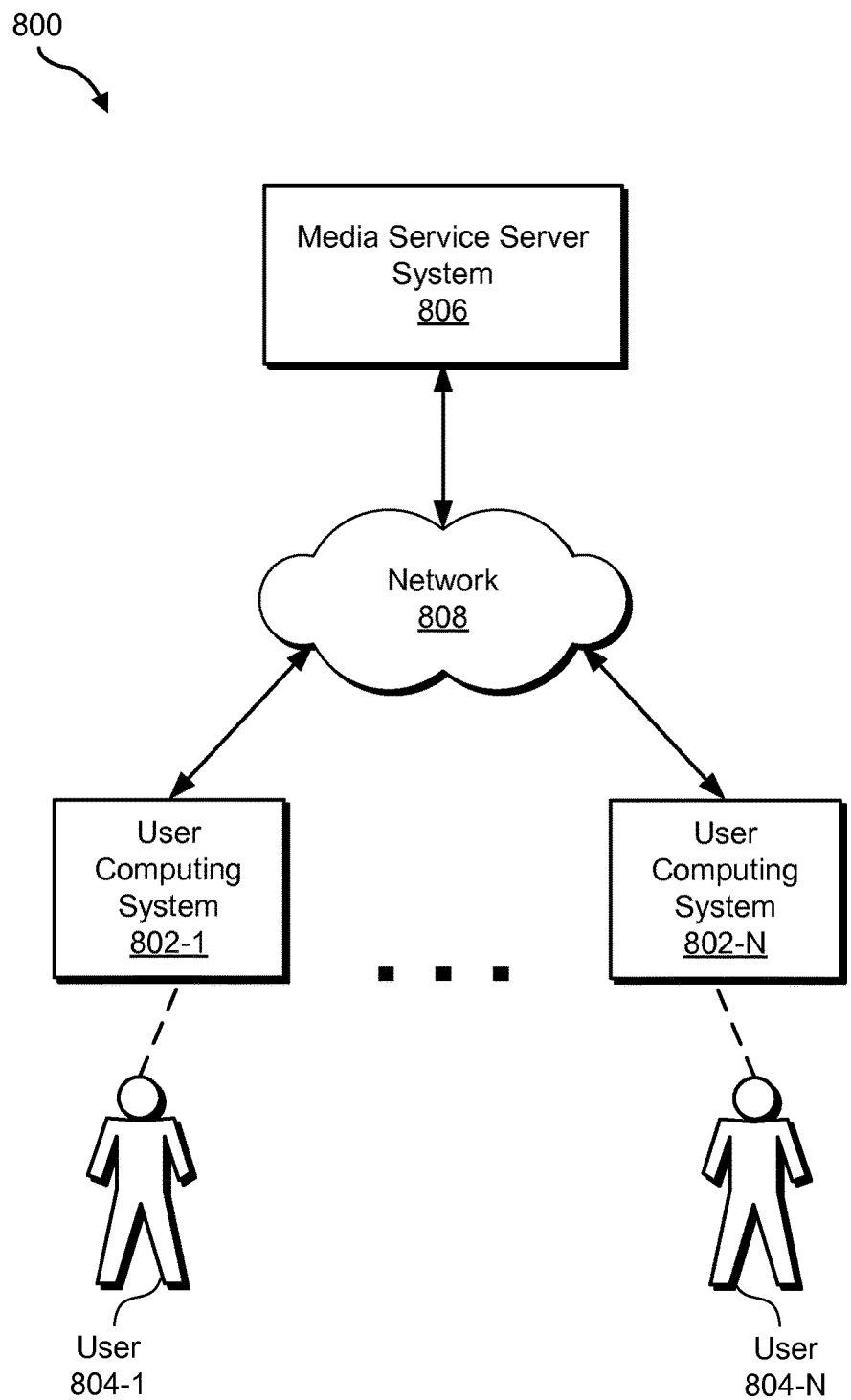
FIG. 8 illustrates an exemplary implementation of the system of FIG. 1 according to principles described herein.

FIG. 8 shows an exemplary implementation 800 of system 100. As shown, implementation 800 may include user computing systems 802 (e.g., user computing systems 802-1 through 802-N) respectively associated with users 804 (e.g., users 804-1 through 804-N), which may be end users of a media service provided by system 100. User computing systems 802 may be in communication with a media service server system 806 ("server system 806"), which may include one or more computing devices (e.g., server devices remotely located from user computing systems 802). In implementation 800, one or more of facilities 102-106 of system 100 may be implemented entirely by a user computing system 802, entirely by server system 806, or distributed across a user computing system 802 and server system 806 in any manner configured to facilitate a user 804 accessing the media service and/or media programs provided by system 100.

User computing systems 802 and server system 806 may communicate using any communication platforms and technologies suitable for transporting data (e.g., media program data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, user computing systems 802 and server system 806 may communicate via a network 808. Network 808 may include one or more networks, such as one or more wireless networks (Wi-Fi networks), wireless communication networks, mobile telephone networks (e.g., cellular telephone networks), closed media networks, open media networks, wide area networks (e.g., the Internet), local area networks, and any other networks capable of carrying data (e.g., streaming and/or downloading media programs) and/or communications signals between user computing systems 802 and server system 806. Communications between user computing systems 802 and server system 806 may be transported using any one of the above-listed networks, or any combination or sub-combination of the above-listed networks. Alternatively, user computing systems 802 and server system 806 may communicate in another way such as by direct connections between user computing systems 802 and server system 806.

Server system 806 may be configured to distribute media programs to user computing systems 802 for access and use by user computing systems 802 to present media programs for consumption by users 804. Server system 806 may distribute media programs to user computing systems 802 as part of the media service provided by system 100 and using any suitable media streaming and/or downloading technologies (e.g., Internet media streaming and/or downloading technologies). In certain examples, the media service may comprise an online media streaming service such as an Internet streaming video service, and server system 806 may be configured to stream media programs on-demand to user computing systems 802 by way of network 808.

In certain examples, server system 806 may be configured to provide one or more user interfaces for access by user computing systems 802. The user interfaces may be configured for use by users 804 to interact with the media service, including discovering and/or accessing media programs distributed by way of the media service. The user interfaces may include any of the exemplary user interface views described herein.

A user computing system 802 may be configured for use by a user 804 associated with (e.g., operating) the user computing system 802 to access the media service provided by system 100. For example, the user 804 may utilize the user computing system 802 to access one or more user interfaces provided by system 100 as part of the media service, and to present the user interfaces for use by the user 804 to discover, access, and/or consume media programs distributed by server system 806 as part of the media service.

A user computing system 802 may include one or more user computing devices associated with a user 804. Examples of such devices include, without limitation, a media player computing device, a display device, a set-top box, a digital video recording ("DVR") device, a computer, a tablet computer, a smart phone device, and any other device capable of accessing the media service and/or media programs provided by system 100.

In certain examples, a user computing system 802 may include a first user computing device (e.g., a primary display device) configured to play back a media program and a second user computing device (e.g., a secondary or companion display device) configured to display a graphical user interface that may compliment or be used together with the playback of the media program by the first user computing device. For instance, a television may provide a primary display screen on which a video program may be displayed, and a tablet computer may provide a secondary display screen on which a graphical user interface (e.g., a graphical user interface related to the video program, the playback of the video program, and/or the media service) may be displayed. Such an example is illustrative only. Other examples of a user computing system 802 may include any combination of user computing devices or a single user computing device configured to perform any of the user computing system and/or device operations described herein.

Figure 9:
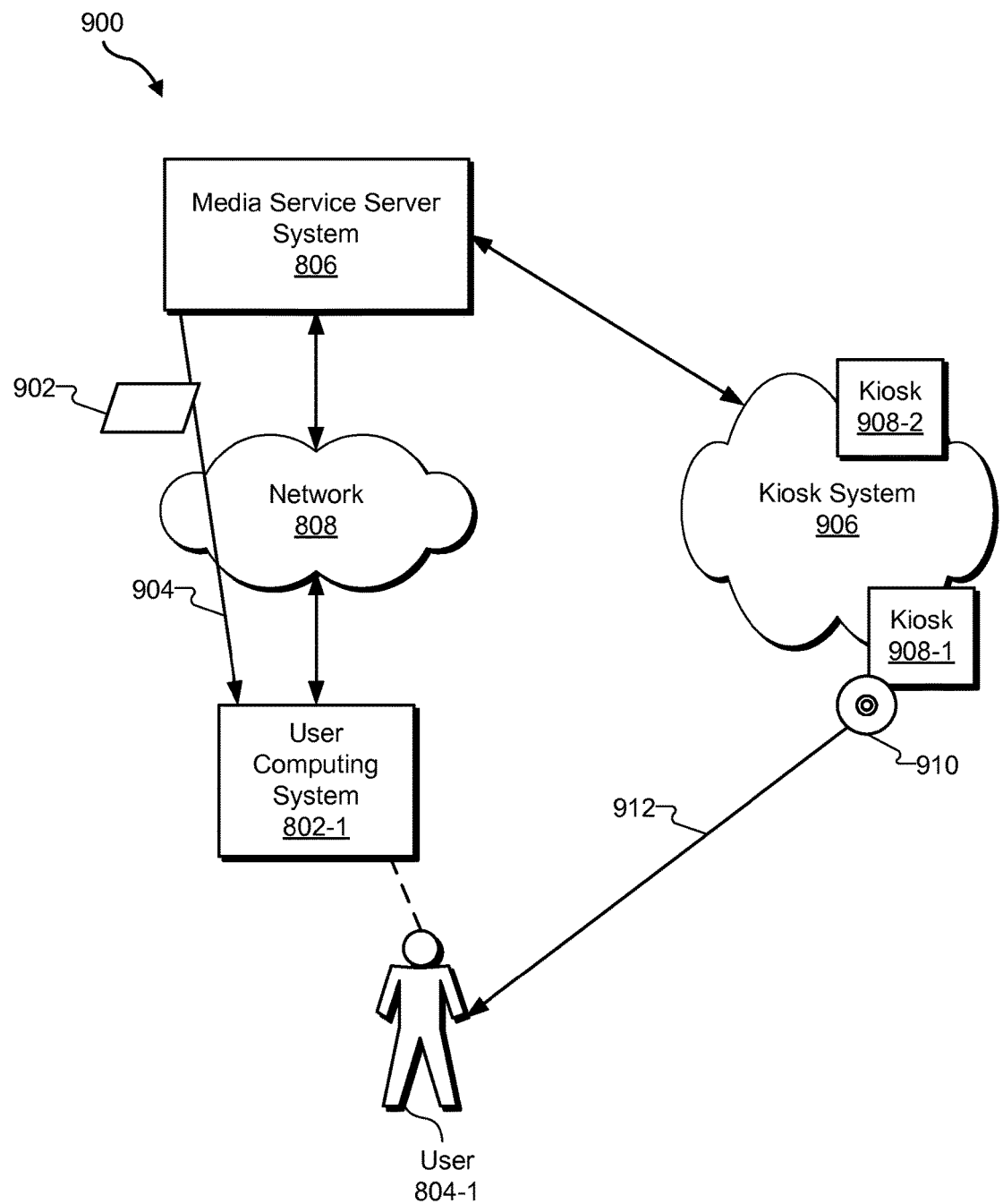
FIG. 9 illustrates another exemplary implementation of the system of FIG. 1 according to principles described herein.

FIG. 9 illustrates an exemplary implementation 900 of system 100. Implementation 900 is similar to implementation 800 and additionally utilizes an exemplary media distribution configuration to distribute media programs to end users of a media distribution service. The media distribution configuration may support distribution of media programs, through the media distribution service, by way of multiple different media distribution channels, such as a digital media distribution channel and a physical media distribution channel. As shown, server system 906 may distribute media programs such as digital data 902 representative of a media program to user computing system 802-1 by way of a digital media distribution channel 904. This distribution may utilize any suitable media streaming and/or downloading technologies (e.g., Internet media streaming and/or downloading technologies) to support delivery of digital data representative of media programs to user computing system 802 by way of network 808.

As further shown in FIG. 9, server system 806 may be in communication with a media vending kiosk system 906, which may include one or more geographically distributed vending kiosks 908 (e.g., vending kiosks 908-1 and 908-2) configured to vend physical copies of media programs, such as a physical copy 910 of a media program, to user 804-1 by way of a physical media distribution channel 912. For example, user 804-1 may visit a location of media vending kiosk 908-1 and obtain the physical copy 910 of the media program from the media vending kiosk 908-1. In certain examples, one or more of the vending kiosks 908 may include automated media vending machines.

In certain examples, implementation 900 may be configured to provide users of the media distribution service with access to media programs by way of a plurality of different media distribution models ("distribution models"). Each distribution model may define a particular way that an end user of the media distribution service may gain access to media programs through the media distribution service. Thus, a user of the media distribution service may be able to gain access to media programs by way of multiple different distribution models.

In certain examples, the distribution models may include multiple distribution channel-based models such as a digital media distribution model that corresponds to a digital media distribution channel and a physical media distribution model that corresponds to a physical media distribution channel. For example, a digital media programs distribution model may include and/or utilize the digital media distribution channel 904 of FIG. 9, and a physical media distribution model may include or utilize the physical media distribution channel 912 of FIG. 9.

Additionally or alternatively, the distribution models may include different compensation-based models for gaining access to media programs. For example, the distribution models may include one or more subscription-based distribution models and one or more transactional-based distribution models. A subscription-based distribution model may be defined by a service provider to provide a user with access to certain media programs based on a subscription of the user to the media distribution service (e.g., a monthly-fee subscription, a temporary free-trial subscription, or another defined subscription). A transactional-based distribution model may be defined by a service provider to provide a user with access to certain media programs based on discrete transactions dedicated to accessing specific media programs. For example, access to a media program may be provided in exchange for a fee dedicated to a rental or a purchase of the media program. The conditions of the access may be defined to be different for a rental and a purchase of the media program, in which case each of the rental and the purchase may be a different transaction-based distribution model (e.g., a media rental distribution model and a media purchase distribution model).

In certain examples, the distribution models may include different models that are combinations of channel-based distribution models and compensation-based distribution models. For example, the different models may include one or more of a subscription-based and digital channel-based distribution model, a transactional-based and digital channel-based distribution model, a subscription-based and physical channel-based distribution model, and a transactional-based and physical channel-based distribution model.

Figure 10:
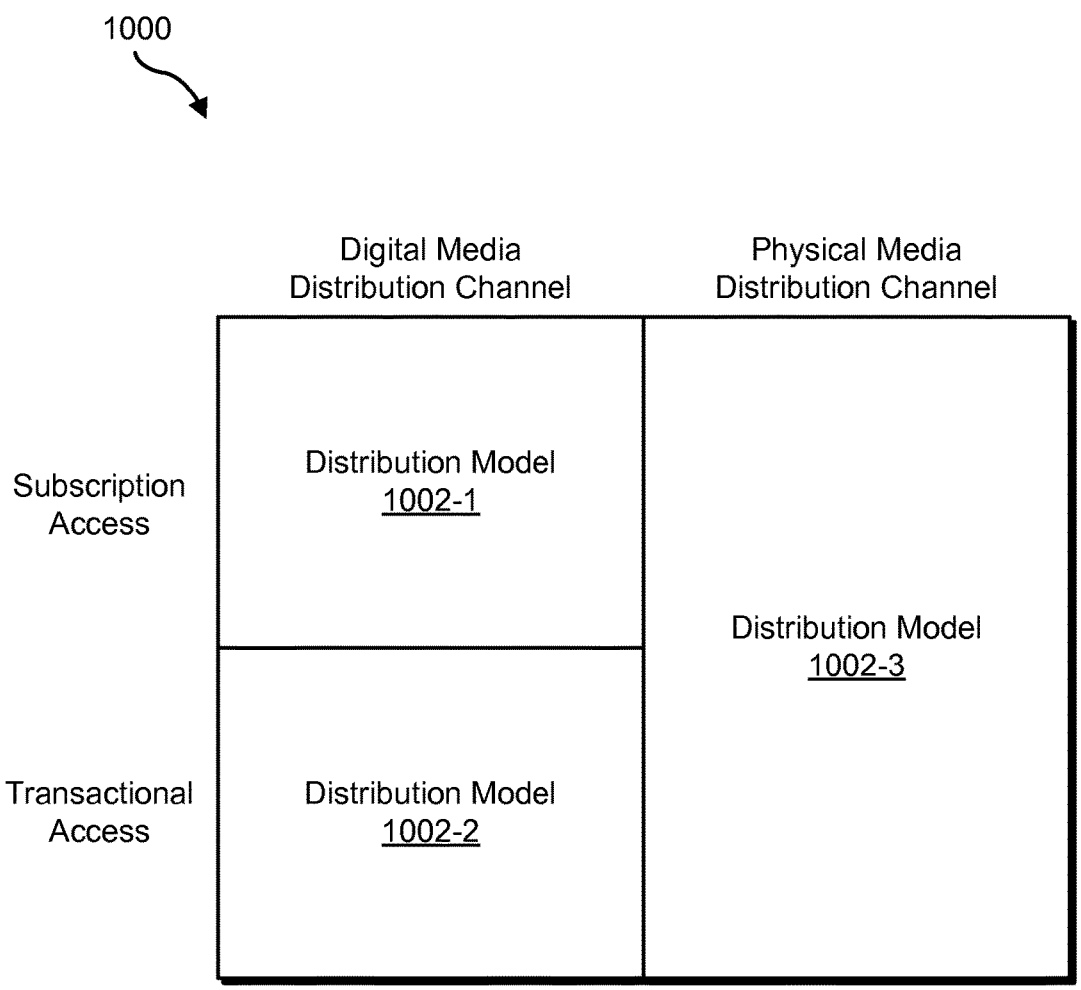
FIG. 10 illustrates a table representing an exemplary set of different media distribution models by way of which access to media programs may be provided by way of a media distribution service according to principles described herein.

Implementation 900 may be configured to provide users of the media distribution service with access to media programs by way of any of the different distribution models described herein, or by way of any combination or subcombination thereof. As an example, FIG. 10 illustrates a table 1000 representing a set of different distribution models by way of which access to media programs may be provided through the media distribution service in certain examples. As shown, the set of distribution models includes a first distribution model 1002-1 associated with subscription-based access to media programs by way of a digital media distribution channel, a second distribution model 1002-2 associated with transactional-based access to media programs by way of the digital media distribution channel, and a third distribution model 1002-3 associated with either or both subscription-based or transactional-based access to media programs by way of a physical media distribution channel. In certain examples, these distribution models 1002 may be referred to as a "subscription" digital distribution model 1002-1, an "on-demand" or "rent/buy" digital distribution model 1002-2, and a "physical" or "kiosk" distribution model 1002-3.

Media programs distributed by implementation 900 as part of the media distribution service may be assigned (e.g., by a provider of the media distribution service) to one or more of the distribution models provided by implementation 900. For example, certain media programs may be made available by way of all of the distribution models and certain media programs may be made available by way of only a subset of the distribution models (e.g., by way of only a subscription-based and digital channel-based distribution model, only a transaction-based and digital channel-based distribution model, only a physical channel-based distribution model, only a transaction-based distribution model, etc.).

In certain examples, assignments of media programs to distribution models may change over time. For example, for a first period of time, a media program may be distributed by way of distribution model 1002-3 only. At the end of that period of time, the media program may leave distribution model 1002-3, meaning that the media program is no longer accessible by way of distribution model 1002-3. For a second period of time, however, the same media program may be distributed by way of distribution model 1002-2 only. For example, when the media program leaves distribution model 1002-3, the media program may be added to distribution model 1002-2. At the end of the second period of time, the same media program may leave distribution model 1002-2 and be assigned to distribution model 1002-1. This example is illustrative only, a media program may be made accessible by way of different distribution models or specific combinations of distribution models for specific periods of time, and may be added to or removed from any distribution model in any suitable way.

Implementation 900 may maintain and/or otherwise have access to data representing relationships between media programs and distribution models by way of which the media programs are distributed. Such data may indicate to which distribution models the media programs are assigned and periods of time for the assignments (e.g., periods of time during which media programs are assigned to the distribution models). This data may be maintained in any suitable way, including in distinct source catalogues respectively associated with the distribution models, in an integrated catalogue associated with all of the distribution models (e.g., an integrated catalogue that includes an aggregation of non-redundant data included in the source catalogues), or a combination of such source catalogues and an integrated catalogue.

In certain examples, programming channel facility 102 may use a library of on-demand media content associated with any of the on-demand media distribution models provided by implementation 900, such as a digital subscription-based media distribution model and/or a digital transactional-based media distribution model provided by implementation 900, to curate media programs for a media-on-demand-based programming channel in any of the ways described herein. In certain examples, programming channel facility 102 may provide a media-on-demand-based programming channel as part of the media distribution service provided by implementation 900.

Figure 11:
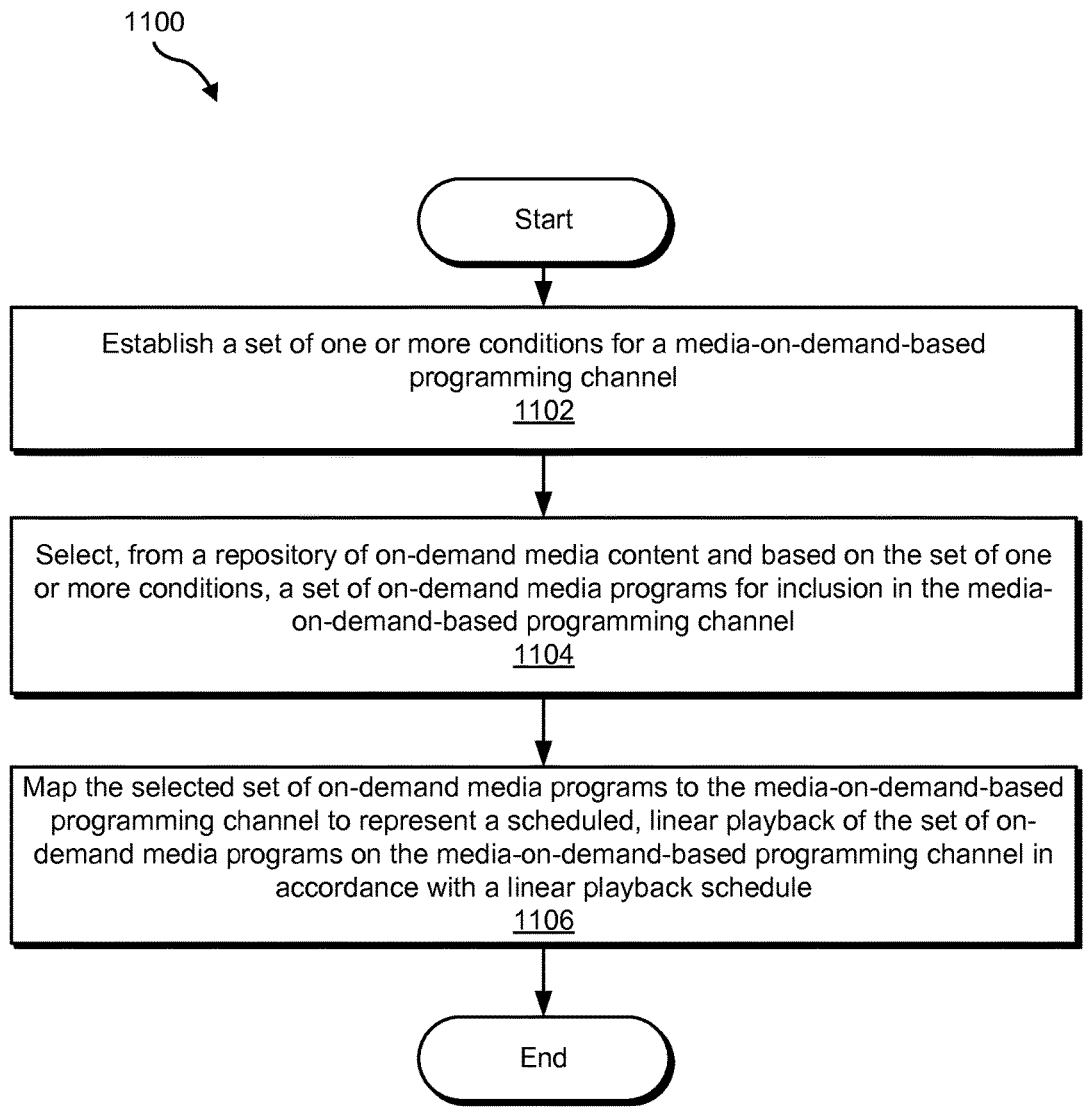
FIGS. 11-12 illustrate exemplary methods of providing a media-on-demand-based programming channel according to principles described herein.
Figure 12:
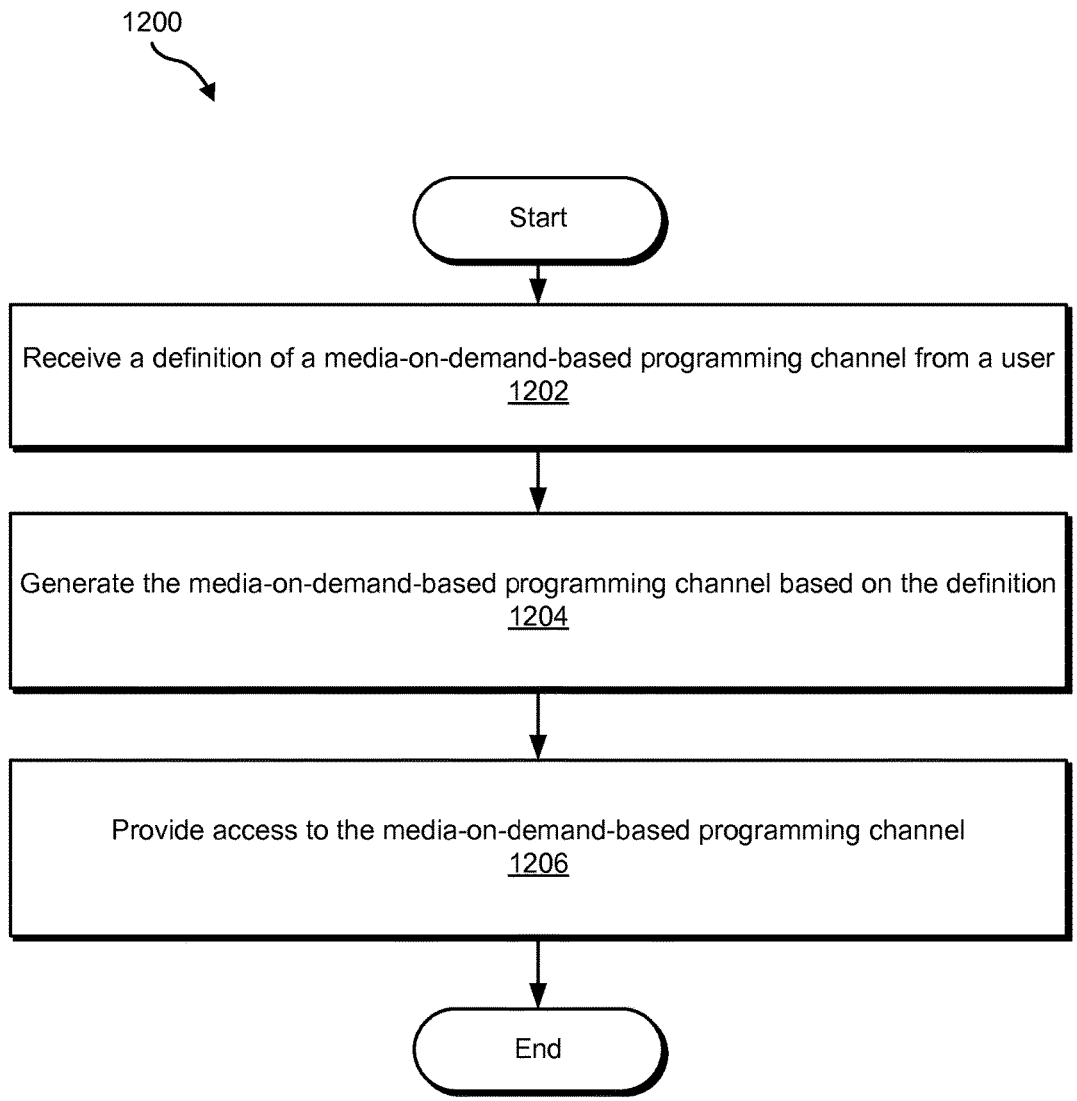

FIGS. 11-12 illustrate exemplary methods 1100-1200 of providing a media-on-demand-based programming channel according to principles described herein. While FIGS. 11-12 illustrate exemplary steps according to certain embodiments, other embodiments may omit, add to, reorder, combine, and/or modify any of the steps shown in FIGS. 11-12. In certain embodiments, one or more of the steps shown in FIGS. 11-12 may be performed by system 100 and/or one or more components or implementations of system 100.

Turning to the method 1100 illustrated in FIG. 11, in step 1102, a system (e.g., system 100) establishes a set of one or more conditions for a media-on-demand-based programming channel. Step 1102 may be performed in any of the ways described herein, and the set of one or more conditions may include any suitable set of conditions such as any of those described herein.

In step 1104, the system selects, from a repository of on-demand media content and based on the set of one or more conditions, a set of on-demand media programs for inclusion in the media-on-demand-based programming channel, such as described herein.

In step 1106, the system maps the selected set of on-demand media programs to the media-on-demand-based programming channel to represent a scheduled, linear playback of the set of on-demand media programs on the media-on-demand-based programming channel in accordance with a linear playback schedule, such as described herein.

Turning to the method 1200 illustrated in FIG. 12, in step 1202, a system (e.g., system 100) receives a definition of a media-on-demand-based programming channel from a user, the definition including a set of one or more conditions for the media-on-demand-based programming channel, such as described herein. The definition may be received in any suitable way from the user, who may be a provider of a media service or an end user of the media service.

In step 1204, the system generates the media-on-demand-based programming channel based on the definition, such as described herein. For example, the system may perform one or more steps of method 1100 to generate the media-on-demand-based programming channel based on the set of one or more conditions included in the definition.

In step 1206, the system provides access to the media-on-demand-based programming channel. Step 1206 may be performed in any of the ways described herein. For example, the system 100 may publish the media-on-demand-based programming channel for access by one or more end users of a media service, visually represent the media-on-demand-based programming channel in a media service user interface, and/or initiate playback of a media program associated with the media-on-demand-based programming channel at a playback position mapped to a current time based on a linear playback schedule, as described herein.

In certain examples, step 1206 may include the system receiving a request to access the media-on-demand-based programming channel. The request may be received at a particular time along a time axis associated with the linear playback schedule. In response to the access request, the system may determine a playback position within the media-on-demand-based programming channel that is mapped to the particular time along the time axis and initiate, at the playback position, a playback of a media program included in the media-on-demand-based programming channel.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a Compact Disc Read-Only Memory ("CD-ROM"), a Digital Versatile Disc ("DVD"), any other optical medium, a Random-Access Memory ("RAM"), a Programmable ROM ("PROM"), an Erasable PROM ("EPROM"), a Flash Electrically EPROM ("FLASH-EEPROM"), any other memory chip or cartridge, or any other tangible medium from which a computer can read.

Figure 13:
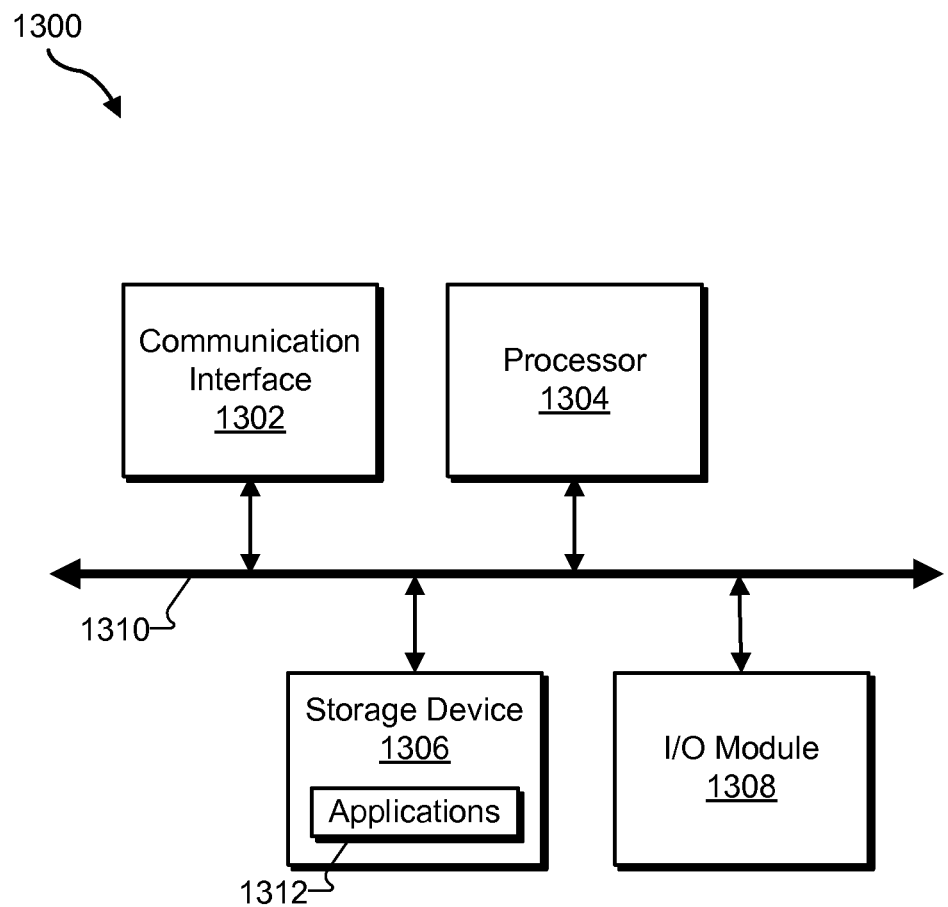
FIG. 13 illustrates an exemplary computing device according to principles described herein.

FIG. 13 illustrates an exemplary computing device 1300 that may be configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional, fewer, or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data or interpreting, executing, and/or directing execution of one or more of the instructions, processes, and/or operations described herein. Processor 1304 may execute and/or direct execution of operations as directed by one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 1306. For example, data representative of one or more applications 1312 configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more GUI views and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with programming channel facility 102 and/or user interface facility 104. Likewise, storage facility 106 may be implemented by or within storage device 1306. Such an implementation may be referred to as a computer-implemented system, such as a computer-implemented media service system 100.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   establishing, by a computer-implemented media service system, a set of one or more conditions for a media-on-demand-based programming channel;
   selecting, by the computer-implemented media service system from a repository of on-demand media content and based on the set of one or more conditions, a set of different on-demand media programs for inclusion in the media-on-demand-based programming channel;
   mapping, by the computer-implemented media service system, the selected set of different on-demand media programs to the media-on-demand-based programming channel to represent a scheduled, linear playback of the selected set of different on-demand media programs on the media-on-demand-based programming channel in accordance with a linear playback schedule, the mapping comprising linearly serializing the selected set of different on-demand media programs along a time axis for consecutive linear playback on the media-on-demand-based programming channel;
   visually representing, by the computer-implemented media service system to a user of a user computing device, the media-on-demand-based programming channel as a single user-selectable channel in an electronic programming guide user interface such that the selected set of different on-demand media programs visually appears to be continually distributed by way of the single user-selectable channel in accordance with the linear playback schedule when the selected set of different on-demand media programs is not actually being continually distributed by way of the single user-selectable channel in accordance with the linear playback schedule;
   receiving, by the computer-implemented media service system, a request to access the single user-selectable channel;
   determining, by the computer-implemented media service system, a playback position within the media-on-demand-based programming channel that is mapped to a particular time along the time axis, the particular time corresponding to a time of the receiving of the request to access the single user-selectable channel;
   initiating, by the computer-implemented media service system in response to the receiving of the request to access the single user-selectable channel and in accordance with the linear playback schedule, on-demand access of an on-demand media program included in the selected set of on-demand media programs from a media service server system for playback by the user computing device by initiating, at the playback position, a playback of the on-demand media program included in the selected set of on-demand media programs; and
   providing, by the computer-implemented media service system during the playback of the on-demand media program, a tool for use by the user to manually move the playback position along the time axis to a playback position within another on-demand media program included in the selected set of on-demand media programs.

2. The method of claim 1, wherein the mapping comprises generating indexing information representative of mappings of playback positions of the on-demand media programs to temporal positions along the time axis.

3. The method of claim 2, further comprising generating, by the computer-implemented media service system, a data structure representative of the media-on-demand-based programming channel, the data structure including a manifest of information specifying the on-demand media programs mapped to the media-on-demand-based programming channel and the indexing information representative of the mappings of the playback positions of the on-demand media programs to the temporal positions along the time axis.

4. The method of claim 1, wherein the establishing of the set of one or more conditions for the media-on-demand-based programming channel comprises defining the set of one or more conditions based on incidental user interaction with a media service.

5. The method of claim 1, wherein the establishing of the set of one or more conditions for the media-on-demand-based programming channel comprises receiving the set of one or more conditions from at least one of a provider of a media service and an end user of the media service by way of a media service user interface.

6. The method of claim 1, further comprising providing, by the computer-implemented media service system, at least one tool for use by an end user of a media service to define the set of one or more conditions for the media-on-demand-based programming channel.

7. The method of claim 1, wherein:
   the set of one or more conditions comprises a set of one or more keywords; and the selecting of the set of different on-demand media programs for inclusion in the media-on-demand-based programming channel comprises searching the repository of on-demand media content for media programs associated with the set of one or more keywords.

8. The method of claim 7, wherein the searching comprises searching user-defined tags associated with the media programs for the set of one or more keywords.

9. The method of claim 1, further comprising publishing, by the computer-implemented media service system, the media-on-demand-based programming channel for access by an end user of a media service.

10. The method of claim 9, wherein the publishing of the media-on-demand-based programming channel comprises sharing the media-on-demand-based programming channel through a social networking service.

11. The method of claim 1, embodied as computer-executable instructions on at least one non-transitory computer-readable medium.

12. The method of claim 1, wherein the mapping of the selected set of different on-demand media programs to the media-on-demand-based programming channel further comprises organizing the selected set of different on-demand media programs based on at least one of:
   a level of relevance of the on-demand media programs in the selected set of different on-demand media programs to the established set of one or more conditions;
   a relative popularity of the on-demand media programs in the selected set of different on-demand media programs; and
   a user input selecting or modifying an order of the on-demand media programs in the selected set of different on-demand media programs.

13. The method of claim 1, wherein:
   the mapping further comprises generating indexing information representative of mappings of playback positions of the selected set of on-demand media programs to temporal positions along the time axis;
   the determining of the playback position within the media-on-demand-based programming channel comprises using the generated indexing information to determine the playback position within the on-demand media program that is mapped to the particular time corresponding to the time of the receiving of the request to access the single user-selectable channel.

14. The method of claim 13, further comprising:
   receiving, by the computer-implemented media service system by way of the provided tool, user input manually moving the playback position along the time axis from a position within the on-demand media program to the playback position within the another on-demand media program included in the selected set of on-demand media programs;
   using, by the computer-implemented media service system and in response to the receiving of the user input, the generated indexing information to initiate on-demand access of the another on-demand media program included in the selected set of on-demand media programs from the media service server system for playback by the user computing device by initiating, at the playback position within the another on-demand media program included in the selected set of on-demand media programs, a playback of the another on-demand media program included in the selected set of on-demand media programs.

15. A method comprising:
   receiving, by a computer-implemented media service system, a definition of a media-on-demand-based programming channel from an end user of a media service by way of a media service user interface, the definition including a set of one or more conditions defined by the end user of the media service; and
   generating, by the computer-implemented media service system, the media-on-demand-based programming channel based on the definition, the generating comprising:
      selecting, from a repository of on-demand media content and based on the set of one or more conditions, a set of different on-demand media programs for inclusion in the media-on-demand-based programming channel, and
      mapping the selected set of different on-demand media programs to the media-on-demand-based programming channel to represent a scheduled, linear playback of the selected set of different on-demand media programs on the media-on-demand-based programming channel in accordance with a linear playback schedule, the mapping comprising linearly serializing the selected set of different on-demand media programs along a time axis for consecutive linear playback on the media-on-demand-based programming channel;
   visually representing, by the computer-implemented media service system to the end user of the media service, the media-on-demand-based programming channel as a single user-selectable channel in an electronic programming guide user interface such that the selected set of different on-demand media programs visually appears to be continually distributed by way of the single user-selectable channel in accordance with the linear playback schedule when the selected set of different on-demand media programs is not actually being continually distributed by way of the single user-selectable channel in accordance with the linear playback schedule;
   receiving, by the computer-implemented media service system, a request to access the single user-selectable channel;
   determining, by the computer-implemented media service system, a playback position within the media-on-demand-based programming channel that is mapped to a particular time along the time axis, the particular time corresponding to a time of the receiving of the request to access the single user-selectable channel;
   initiating, by the computer-implemented media service system in response to the receiving of the request to access the single user-selectable channel and in accordance with the linear playback schedule, on-demand access of an on-demand media program included in the selected set of on-demand media programs from a media service server system for playback by a user computing device associated with the end user of the media service by initiating, at the playback position, a playback of the on-demand media program included in the selected set of on-demand media programs; and
   providing, by the computer-implemented media service system during the playback of the on-demand media program, a tool for use by the user to manually move the playback position along the time axis to a playback position within another on-demand media program included in the selected set of on-demand media programs.

16. The method of claim 15, wherein the generating further comprises publishing the media-on-demand-based programming channel for access by at least one of the end user of the media service and another end user of the media service.

17. The method of claim 15, embodied as computer-executable instructions on at least one non-transitory computer-readable medium.

18. A system comprising:
a processor; and
a memory storing instructions that, when executed, direct the processor to:
establish a set of one or more conditions for a media-on-demand-based programming channel;
select, from a repository of on-demand media content and based on the set of one or more conditions, a set of different on-demand media programs for inclusion in the media-on-demand-based programming channel;
map the selected set of different on-demand media programs to the media-on-demand-based programming channel to represent a scheduled, linear playback of the selected set of different on-demand media programs on the media-on-demand-based programming channel in accordance with a linear playback schedule by linearly serializing the selected set of different on-demand media programs along a time axis for consecutive linear playback on the media-on-demand-based programming channel;
visually represent, to a user of a user computing device, the media-on-demand-based programming channel as a single user-selectable channel in an electronic programming guide user interface such that the selected set of different on-demand media programs visually appears to be continually distributed by way of the single user-selectable channel in accordance with the linear playback schedule when the selected set of different on-demand media programs is not actually being distributed by way of the single user-selectable channel in accordance with the linear playback schedule;
receive a request to access the single user-selectable channel;
determine a playback position within the media-on-demand-based programming channel that is mapped to a particular time along the time axis, the particular time corresponding to a time of the receipt of the request to access the single user-selectable channel;
initiate, in response to the receiving of the request to access the single user-selectable channel and in accordance with the linear playback schedule, on-demand access of an on-demand media program included in the selected set of on-demand media programs from a media service server system for playback by the user computing device by initiating, at the playback position, a playback of the on-demand media program included in the selected set of on-demand media programs; and
provide, during the playback of the on-demand media program, a tool for use by the user to manually move the playback position along the time axis to a playback position within another on-demand media program included in the selected set of on-demand media programs.

19. The system of claim 18, wherein the memory further stores instructions that, when executed, direct the processor to establish the set of one or more conditions for the media-on-demand-based programming channel based on user input provided by an end user of a media service by way of a condition definition tool of a media service user interface.

20. The system of claim 18, wherein the memory further stores instructions that, when executed, direct the processor to publish the media-on-demand-based programming channel for access by an end user of a media service.

21. The system of claim 18, wherein the memory further stores instructions that, when executed, direct the processor to map the selected set of different on-demand media programs to the media-on-demand-based programming channel by organizing the selected set of different on-demand media programs based on at least one of:
a level of relevance of the on-demand media programs in the selected set of different on-demand media programs to the established set of one or more conditions;
a relative popularity of the on-demand media programs in the selected set of different on-demand media programs; and
a user input selecting or modifying an order of the on-demand media programs in the selected set of different on-demand media programs.

* * * * *